(12) United States Patent
Williams et al.

(10) Patent No.: US 11,722,340 B1
(45) Date of Patent: Aug. 8, 2023

(54) SYSTEMS AND METHODS FOR COMPARING COMMUNICATION LINKS

(71) Applicant: Cable Television Laboratories, Inc., Louisville, CO (US)

(72) Inventors: Thomas Holtzman Williams, Longmont, CO (US); Luis Alberto Campos, Superior, CO (US); Lin Cheng, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 18/151,542

(22) Filed: Jan. 9, 2023

Related U.S. Application Data

(62) Division of application No. 17/657,712, filed on Apr. 1, 2022, now Pat. No. 11,552,831.

(60) Provisional application No. 63/237,288, filed on Aug. 26, 2021, provisional application No. 63/169,313, filed on Apr. 1, 2021.

(51) Int. Cl.
*H04L 25/03* (2006.01)

(52) U.S. Cl.
CPC ............... *H04L 25/03012* (2013.01); *H04L 2025/03541* (2013.01)

(58) Field of Classification Search
CPC ............... H04L 25/03012; H04L 2025/03541
See application file for complete search history.

(56) References Cited

U.S. PATENT DOCUMENTS

| | | | | |
|---|---|---|---|---|
| 5,195,106 A | * | 3/1993 | Kazecki | H04L 27/22 375/230 |
| 6,538,704 B1 | * | 3/2003 | Grabb | H04N 5/211 455/185.1 |
| 7,623,578 B2 | | 11/2009 | Pisoni et al. | |
| 2004/0100587 A1 | | 5/2004 | Kim | |
| 2007/0140387 A1 | | 6/2007 | Wong et al. | |

* cited by examiner

*Primary Examiner* — Vineeta S Panwalkar
(74) *Attorney, Agent, or Firm* — PdZ Patent Law, PLLC

(57) ABSTRACT

A method for comparing communication links in a communication network includes (a) obtaining first raw equalizer coefficients in a frequency domain, the first raw equalizer coefficients corresponding to a first communication link, (b) obtaining second raw equalizer coefficients in the frequency domain, the second raw equalizer coefficients corresponding to a second communication link, (c) removing time delay from the first raw equalizer coefficients to generate first corrected equalizer coefficients, (d) removing time delay from the second raw equalizer coefficients to generate second corrected equalizer coefficients, and (e) comparing the first corrected equalizer coefficients to the second corrected equalizer coefficients to determine a relationship between the first and second communication links.

20 Claims, 20 Drawing Sheets

SYSTEMS AND METHODS FOR COMPARING COMMUNICATION LINKS

CROSS REFERENCE TO RELATED APPLICATIONS

This application is a divisional of U.S. patent application Ser. No. 17/657,712, filed on Apr. 1, 2022, which claims the benefit of priority to each of (a) U.S. Provisional Patent Application Ser. No. 63/169,313, filed on Apr. 1, 2021, and (b) U.S. Provisional Patent Application Ser. No. 63/237,288, filed on Aug. 26, 2021. Each of the aforementioned patent applications is incorporated herein by reference.

BACKGROUND

A communication link, such as a wireline communication link or a wireless communication link, typically experiences distortion due to non-ideal properties of the communication link. Communication link distortion can be classified as either linear distortion or non-linear distortion. Examples of linear distortion include, but are not limited to, group delay, echoes, echo tunnels, ghosts, tilt, filters, reflections, suckouts, and peaking. Examples of non-linear distortion include, but are not limited to, harmonics, common path distortion (CPD), passive intermodulation (PIM), signal compression, and clipping.

Linear distortion of a communication link can be compensated for by a process called equalization, where a communication signal is modified to cancel the linear distortion of the communication link. For example, equalization can be performed at a transmitter of a communication link by pre-distorting a signal to be transmitted by an inverse of a channel response of the communication link. As another example, equalization can be performed at a receiver of a communication link by modifying a received communication signal to cancel linear distortion of the communication link.

DETAILED DESCRIPTION OF THE EMBODIMENTS

Figure 1:
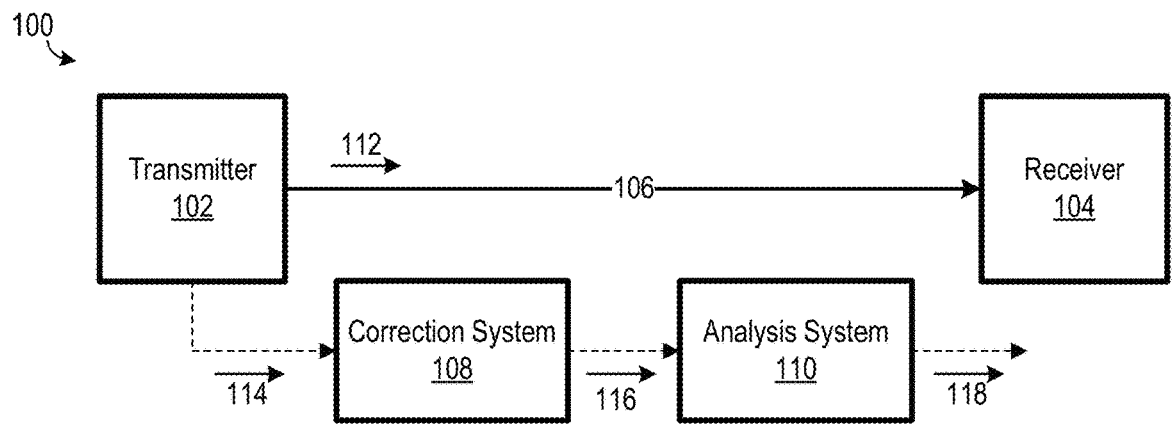
FIG. 1 is a block diagram of a communication network including a system for equalizer correction, according to an embodiment.

Equalization is typically performed in a communication network by digitally modifying communication signals, such as before transmitting the communication signals or after transmitting the communication signals, to cancel linear distortion of the communication signals. A digital filter used for equalization includes multiple taps, which may be referred to as equalizer coefficients, and the equalizer coefficients are selected to cancel distortion of the communication link. For example, equalizer coefficients may be selected so that the equalizer coefficients collectively represent an inverse of a communication link's channel response. Equalizer coefficients may be frequently updated using a process called ranging to reflect changing properties of a communication link. For example, ranging may include (a) transmitting a test signal via a communication link to characterize linear distortion of the communication link and (b) determining equalizer coefficients which at least substantially cancel the linear distortion.

Accordingly, an equalizer can provide valuable information on properties of an associated communication link. For example, equalizer coefficients that represent an inverse channel response of a communication link can be inverted to yield the communication link's channel response, which characterizes the communication link's response to a signal. Furthermore, equalizer coefficients are generally widely available in modern communication networks. For example, equalizer coefficients can often be obtained from communication network termination devices, such as wireline and wireless modems, optical network terminations (ONTs), optical network units (ONUs), and the like. As another example, equalizer coefficients can frequently be obtained from central communication network equipment, such as modem termination systems, wireless base stations, optical line terminals, and the like. Accordingly, equalizer coefficients can be substantially leveraged in modern communication networks to determine properties of the communication networks.

Furthermore, communication networks are increasingly implementing multi-carrier modulation techniques, such as orthogonal frequency division multiplexing (OFDM) modulation techniques and orthogonal frequency division multiple access (OFDMA) modulation techniques. While single-carrier modulation techniques require equalizer coefficients for only a single carrier, multi-carrier modulation techniques require equalizer coefficients for each carrier used with the modulation technique. Consequently, a communication link using a multi-carrier modulation technique requires a significantly more equalizer coefficients than a communication link using a single-carrier modulation technique. Additionally, communication link analysis based on equalizer coefficients generally increases in bandwidth and resolution with increasing number of equalizer coefficients used in the analysis. Therefore, OFDM and OFDMA communication links are particularly well suited for analysis via equalizer coefficients due to the large quantity of equalizer coefficients generated by these communication links.

However, raw equalizer coefficients from multi-carrier communication links are generally not suitable for analysis without further processing. In particular, Applicant has found that conventional communication network equipment using a multi-carrier communication link typically adds a random time delay to equalizer coefficients, such as while performing ranging. The equalizer coefficients are complex values, and the random time delay causes the equalizer coefficients to have a phase that varies with frequency, which interferes with analysis of the equalizer coefficients to determine communication link properties.

Disclosed herein are systems and methods for equalizer correction which at least partially overcome the above-discussed problems. The new systems and methods advantageously remove time delay from raw equalizer coefficients, such as from equalizer coefficients generated by a OFDM communication link or a OFDMA communication link, to yield corrected equalizer coefficients which may be used to analyze communication link properties. In some embodiments, the systems and methods modify equalizer coefficients such that (a) direct current (DC) equalizer coefficient is a real value instead of a complex value and (b) remaining equalizer coefficients have respective phases that are referenced to the DC equalizer coefficient. Additionally, certain embodiments of the new systems and methods advantageously leverage aspects of both the frequency domain and the time domain, instead of operating solely in the frequency domain or operating solely the time domain, which promotes efficient processing and preservation of information expressed by the raw equalizer coefficients. Furthermore, some embodiments are configured to determine impairment of a communication link from corrected equalizer coefficients. Moreover, particular embodiments are configured to compare corrected equalizer coefficients from multiple communication links to automatically determine additional information about a communication network, such as topology of the communication network or an identity of multiple communication links sharing a common impairment.

Corrected equalizer coefficients derived from multi-carrier communication links using the disclosed systems and methods have many possible applications due to their relatively high frequency bandwidth and high time resolution, relative to equalizer coefficients derived from a single-carrier communication link. Possible applications of the corrected equalizer coefficients include, but are not limited to, (a) wideband downstream and upstream response matching, (b) investigation of correct sizing of ODFM/OFDMA cyclic prefix (CP) length, (c) detecting intermittent impairment from unstable corrected equalizer coefficients, (d) detecting presence of interference or ingress from band-limited corrected equalizer coefficients, (e) detecting presence of wiring problems, such as broken coaxial electrical cable shields, from energy in low-index corrected equalizer coefficients, (f) detection of water in an electrical cable, such as water in a coaxial electrical cable, (g) identification of devices being connected to a common communication medium, such as a common coaxial electrical cable segment, by matching a channel response described by corrected equalizer coefficients or by identifying amplifiers in cascade from corrected equalizer coefficients, and (h) enabling equalizer coefficients analysis in field test gear, such as to provide time domain reflectometer (TDR) functionality.

FIG. 1 is a block diagram of a communication network 100 including a transmitter 102, a receiver 104, a communication link 106, a system 108 for equalizer correction, and an optional analysis system 110. System 108 for equalizer correction, henceforth referred to as "correction system 108" for brevity, is one embodiment of the new systems for equalizer correction disclosed herein. Transmitter 102 is configured to generate a communication signal 112 for transmission to receiver 104 by communication link 106. Communication signal 112 is, for example, a digital communication signal. In some embodiments, communication signal 112 is a multi-carrier communication signal, such as a OFDM communication signal or a OFDMA communication signal.

Figure 2:
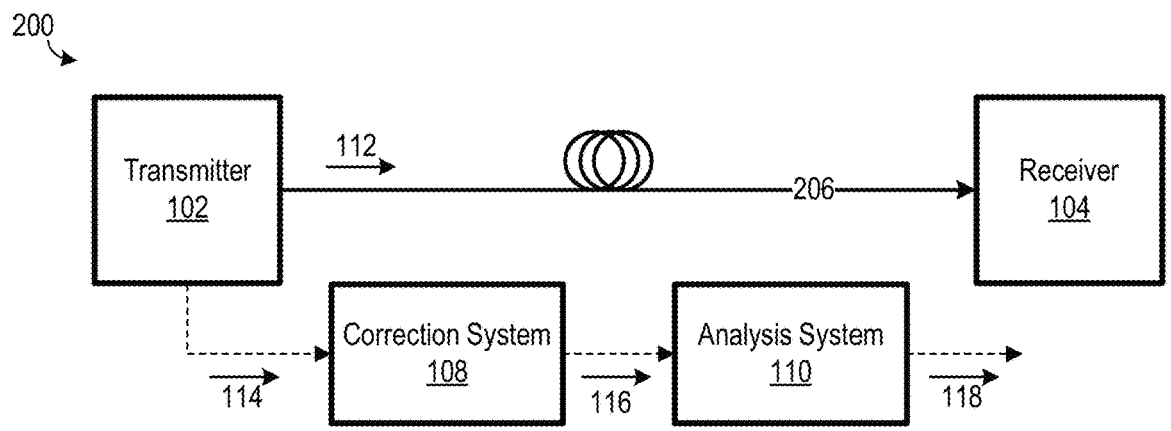
FIG. 2 is a block diagram of an embodiment of the FIG. 1 communication network including a wireline communication link.
Figure 3:
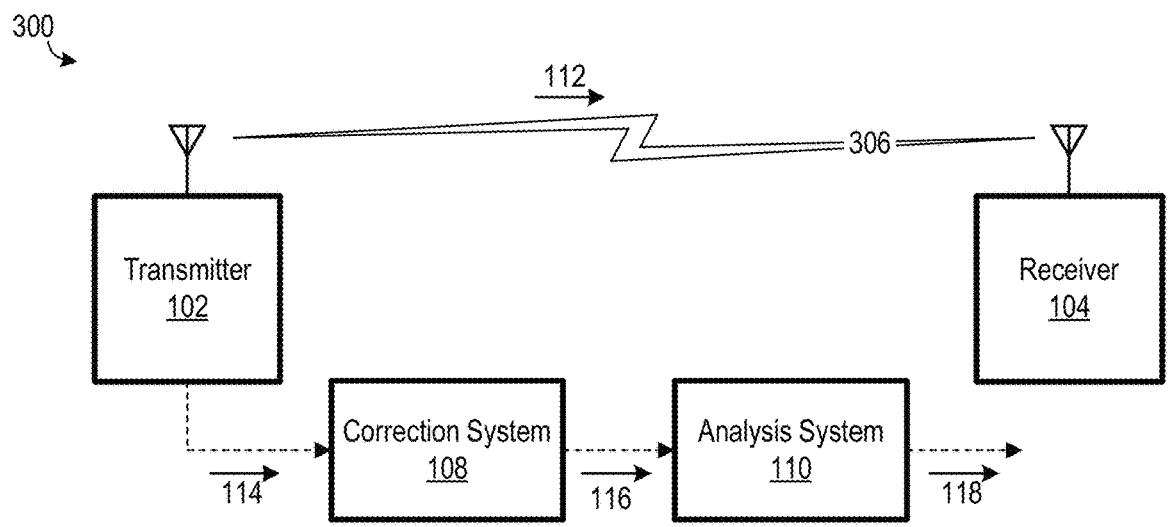
FIG. 3 is a block diagram of an embodiment of the FIG. 1 communication network including a wireless communication link.

Communication link 106 may include a wireline communication link or a wireless communication link. Additionally, communication link 106 may include multiple sub-elements (not shown) that need not have the same configuration. For example, in some embodiments, communication link 106 is a hybrid optical communication link and electrical communication link, a hybrid optical communication link and wireless communication link, or a hybrid optical communication link, electrical communication link, and wireless communication link. FIGS. 2 and 3, discussed below, illustrate two possible embodiments of communication link 106. It is understood, however, that communication link 106 is not limited to the example embodiments of FIGS. 2 and 3.

FIG. 2 is a block diagram of a communication network 200, which is an embodiment of communication network 100 where communication link 106 is embodied by a wireline communication link 206. Wireline communication link 206 includes, for example, an optical cable communication link and/or an electrical cable communication link. Examples of electrical cables that may be used in wireline communication link 206 include, but are not limited to, a coaxial electrical cable, a twisted pair electrical cable (e.g., a telephone electrical cable or an Ethernet electrical cable), or an electric power cable.

FIG. 3 is a block diagram of a communication network 300, which is an embodiment of communication network 100 where communication link 106 is embodied by a wireless communication link 306. Wireless communication link 306 includes, for example, one or more of a cellular wireless communication link (e.g., a long term evolution (LTE) cellular wireless communication link, a fifth generation (5G) cellular wireless communication link, a sixth generation (6G) cellular wireless communication), a Wi-Fi wireless communication link (e.g., an Institute of Electrical and Electronics Engineers (IEEE) 802.11-based Wi-Fi wireless communication link), a satellite wireless communication link (e.g., a very low earth orbit (VLEO) satellite wireless communication link, a low earth orbit (LEO) satellite wireless communication link, a medium earth orbit (MEO) satellite wireless communication link, or a geostationary equatorial orbit (GEO) satellite wireless communication), a Bluetooth wireless communication link, a long range (LoRa) wireless communication link, and a Zigbee wireless communication link.

Referring again to FIG. 1, transmitter 102 and receiver 104 could be replaced with transceivers capable of bidirectional communication via communication link 106. For example, in some alternate embodiments of network 100, transmitter 102 and receiver 104 are replaced with respective transceivers configured to support half-duplex bidirectional communication and/or full-duplex bidirectional communication.

Correction system 108 is configured to receive raw equalizer coefficients 114 from communication network 100 and generate corrected equalizer coefficients 116 from the raw equalizer coefficients. FIG. 1 depicts correction system 108 receiving raw equalizer coefficients 114 associated with transmitter 102. Transmitter 102 may use raw equalizer coefficients 114, for example, to pre-distort communication signal 112 by an inverse of a channel response of communication link 106, such that communication signal 112 is at least substantially free of linear distortion when received by receiver 104. In these embodiments, raw equalizer coefficients 114 may be referred to as pre-distortion raw equalizer coefficients.

In other embodiments, however, correction system 108 receives raw equalizer coefficients 114 associated with receiver 104. Receiver 104 uses raw equalizer coefficients 114, for example, to post-distort communication signal 112 by an inverse of the channel response of communication link 106, such that communication signal 112 is at least substantially free of linear distortion after post-distortion at receiver 104. In these embodiments, raw equalizer coefficients 114 may be referred to as post-distortion equalizer coefficients.

Raw equalizer coefficients 114 represent, for example, either a channel response of communication link 106 or an inverse of a channel response of communication link 106. Certain embodiments of communication network 100 are configured to determine raw equalizer coefficients 114 at least partially using a ranging process. The quantity of raw equalizer coefficients 114 used by communication network 100 is implementation dependent. Each raw equalizer coefficients 114 is a complex value that may have a random time delay such that phase of raw equalizer coefficients 114 is a function of frequency.

Correction system 108 is configured to at least substantially remove random time delay from raw equalizer coefficients 114 to generate corrected equalizer coefficients 116 which are at least substantially free of the random time delay and associated variation in phase. Corrected equalizer coefficients 116 are used, for example, by optional analysis system 110 (discussed further below), to determine one or more properties of communication link 106 and/or communication network.

Figure 4:
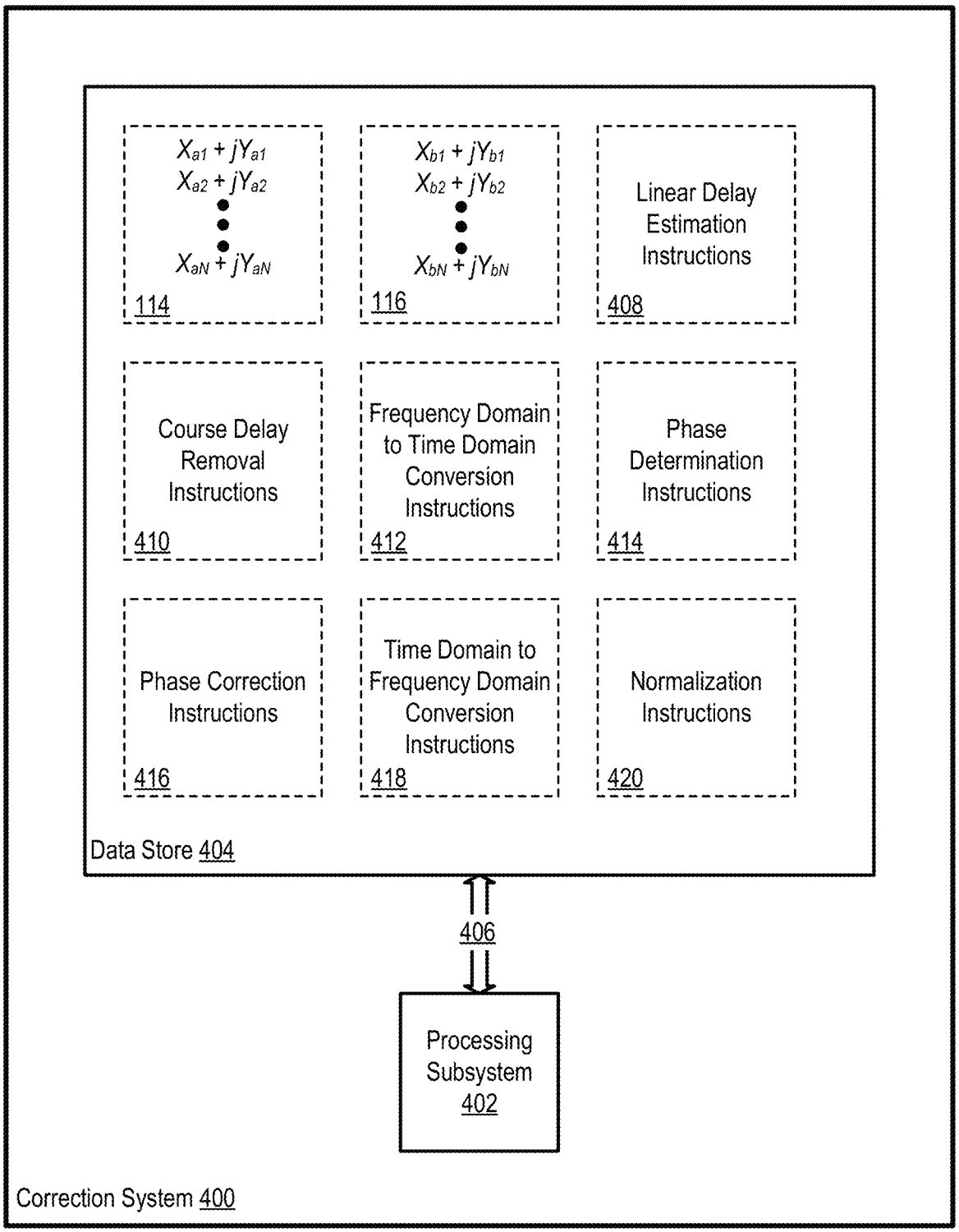
FIG. 4 is a block diagram of one embodiment of the FIG. 1 system for equalizer correction.

FIG. 4 is a block diagram of a system 400 for equalizer correction, henceforth referred to as "correction system 400," which is one possible embodiment of correction system 108 of FIG. 1. It is understood, however, that correction system 108 of FIG. 1 could be implemented in other manners than that depicted in FIG. 4. For example, correction system 108 could alternately be implemented by analog electronic circuitry and/or digital logic hardware.

Correction system 400 includes a processing subsystem 402 and a data store 404. Processing subsystem 402 is communicatively coupled 406 to data store 404, and processing subsystem 402 is configured to execute instructions stored in data store 404 to perform the functions of correction system 108, as discussed below. Although each of processing subsystem 402 and data store 404 is illustrated as being a single element, one or more of processing subsystem 402 and data store 404 could be formed of multiple constituent elements that need not be commonly located. For example, in some embodiments, processing subsystem 402 and data store 404 are embodied by a distributed computing system, such as a cloud computing system, including (a) multiple processors collectively implementing processing subsystem 402 and (b) multiple data storage devices, e.g., memory devices and/or hard drives, collectively implementing data store 404. Additionally, while FIG. 4 depicts processing subsystem 402 and data store 404 as being separate elements, processing subsystem 402 and data store 404 could be at least partially combined without departing from the scope hereof.

Data store 404 is configured to temporarily store (a) raw equalizer coefficients 114 for processing by correction system 400 and (b) corrected equalizer coefficients 116 for transfer to an external system, such as analysis system 110. As illustrated in FIG. 4, each raw equalizer coefficient 114 includes a real component $X_{ak}$ and an imaginary component $Y_{ak}$, and each corrected equalizer coefficient 116 includes a real component $X_{bk}$ and an imaginary component $Y_{bk}$, where (a) k is an index ranging from 1 to N and (b) N is the quantity of raw equalizer coefficients 114 received by correction system 400 from communication network 100. The letter j in FIG. 4 is an imaginary operator, which may alternatively be indicated by the letter i. Each real component $X_{ak}$ and $X_{bk}$ and each imaginary component $Y_{ak}$ and $Y_{bk}$ could be either positive or negative, and any two components need not have the same polarity. There is a one-to-one correspondence between raw equalizer coefficients 114 and corrected equalizer coefficients 116, where each corrected equalizer coefficient 116 is the same as its counterpart raw equalizer coefficient 114 but with any random time delay removed. For example, corrected equalizer coefficient $X_{b1}+jY_{b1}$ is the same as raw equalizer coefficient $X_{a1}+jY_{a1}$ but without any random time delay that might be present in raw equalizer coefficient $X_{a1}+jY_{a1}$. As another example, corrected equalizer coefficient $X_{b2}+jY_{b2}$ is the same as raw equalizer coefficient $X_{a2}+jY_{a2}$ but without any random time delay that might be present in raw equalizer coefficient $X_{a2}+jY_{a2}$.

Figure 5:
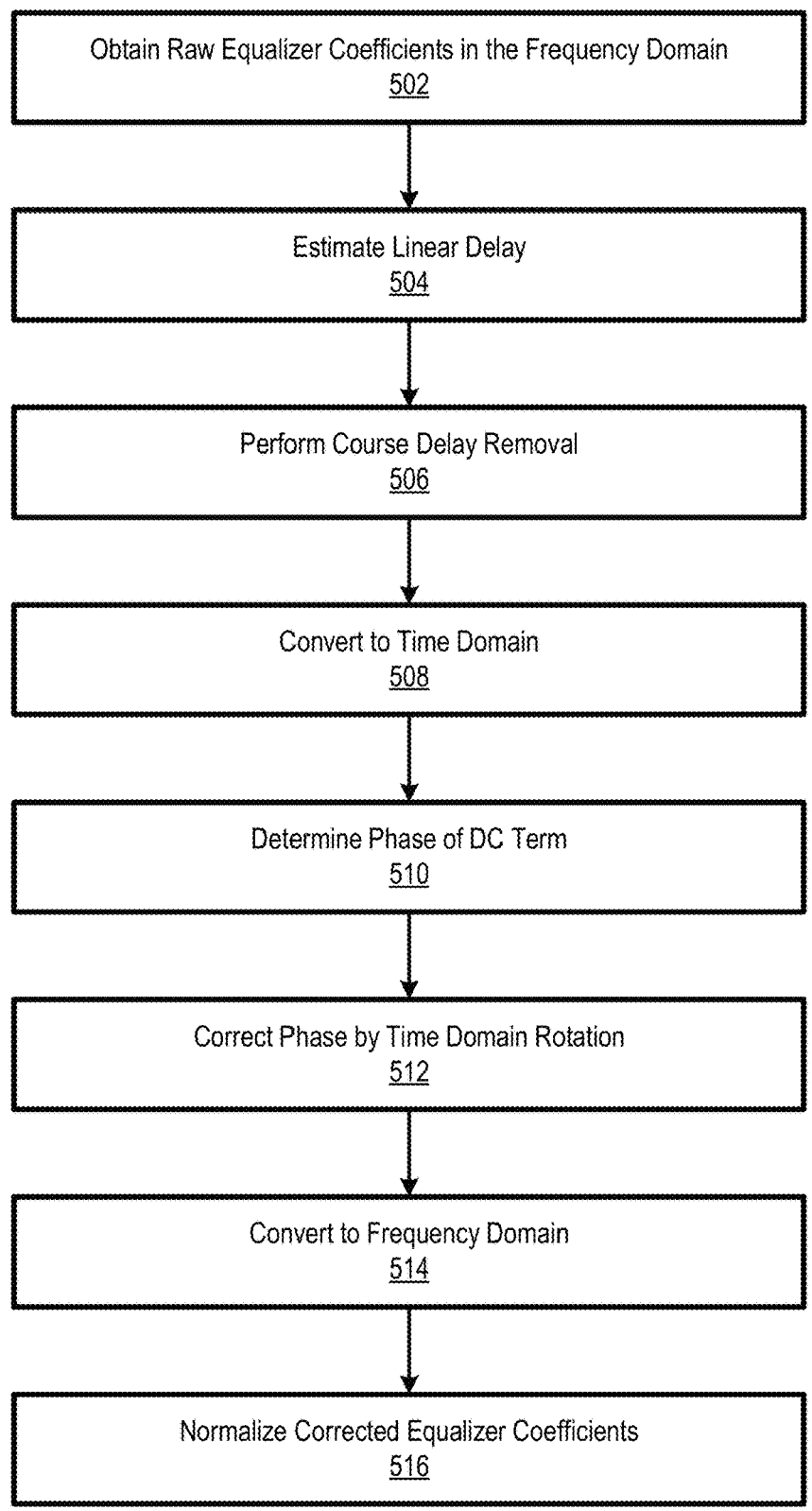
FIG. 5 is a flow chart of a method for equalizer correction, according to an embodiment.

Data store 404 further includes the following instructions: linear delay estimation instructions 408, course delay removal instructions 410, frequency domain to time domain conversion instructions 412, phase determination instructions 414, phase correction instructions 416, optional time domain to frequency domain conversion instructions 418, and optional normalization instructions 420. Processing subsystem 402 is configured to execute instructions 408-420 to convert raw equalizer coefficients 114 to corrected equalizer coefficients 116. For example, FIG. 5 is a flow chart of a method 500 for equalizer correction, which is executed by some embodiments of correction system 400 using instructions 408-420. FIGS. 6A-6G collectively illustrate one example of method 500, although it is understood that method 500 is not limited to this example.

In a block 502 of method 500, correction system 400 obtains raw equalizer coefficients 114 from communication network 100. Method 500 assumes that raw equalizer coefficients 114 are in the frequency domain. However, in some alternate embodiments, correction system 400 receives raw equalizer coefficients 114 in the time domain, and correction system 400 subsequently converts raw equalizer coefficients 114 from the time domain to the frequency domain. In one example of block 502, correction system 400 obtains raw equalizer coefficients 602, which are depicted in a graph 600 of FIG. 6A, where raw equalizer coefficients 602 are an embodiment of raw equalizer coefficients 114. Graph 600 plots I components versus Q components of raw equalizer coefficients 602. As shown in graph 600, raw equalizer coefficients 602 surround an origin 604 of graph 600, which is due to a time delay included in raw equalizer coefficients 602 by communication network 100.

Figure 6A:
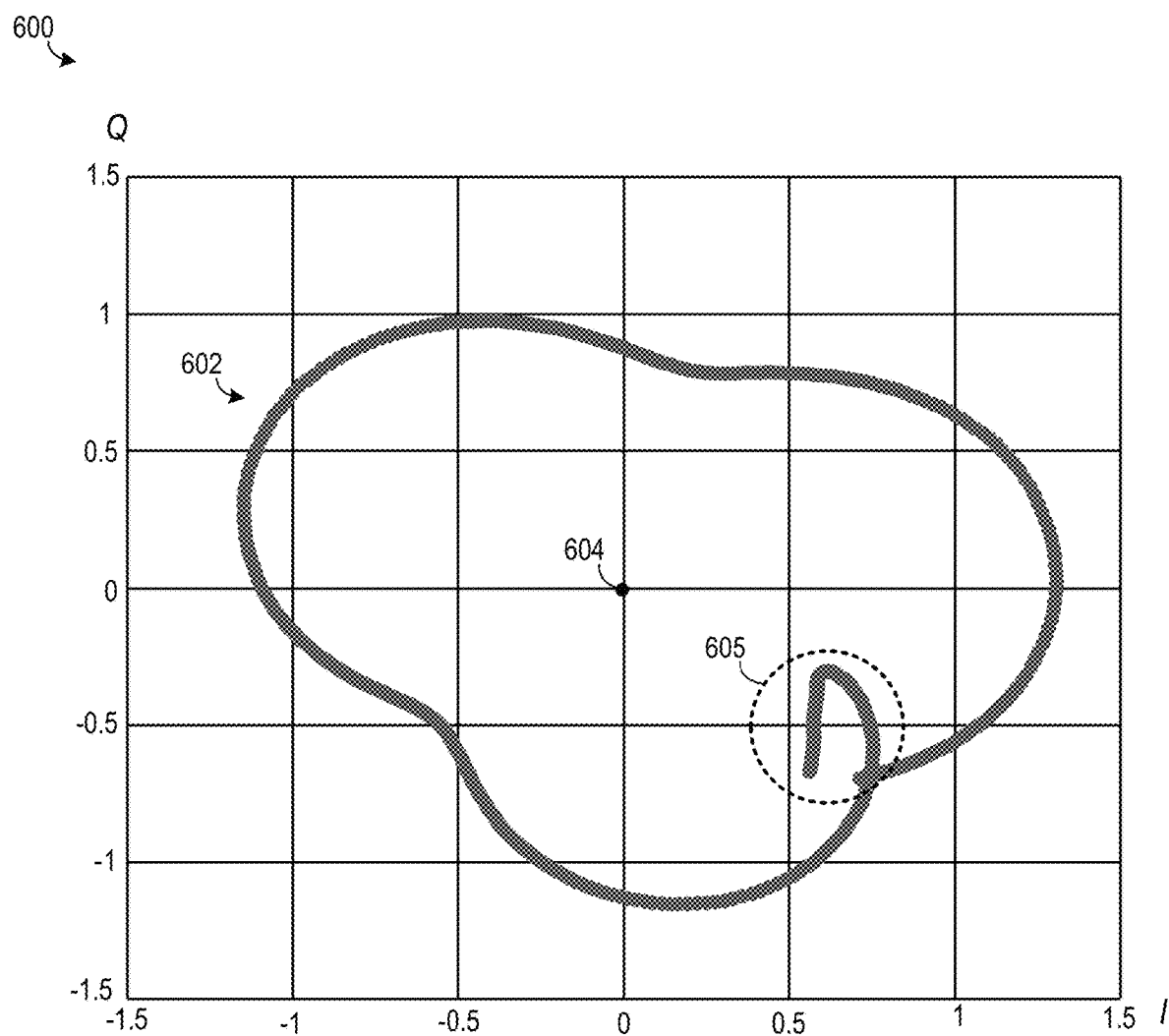
FIG. 6A is a graph of I components versus Q components of example raw equalizer coefficients.
Figure 6B:
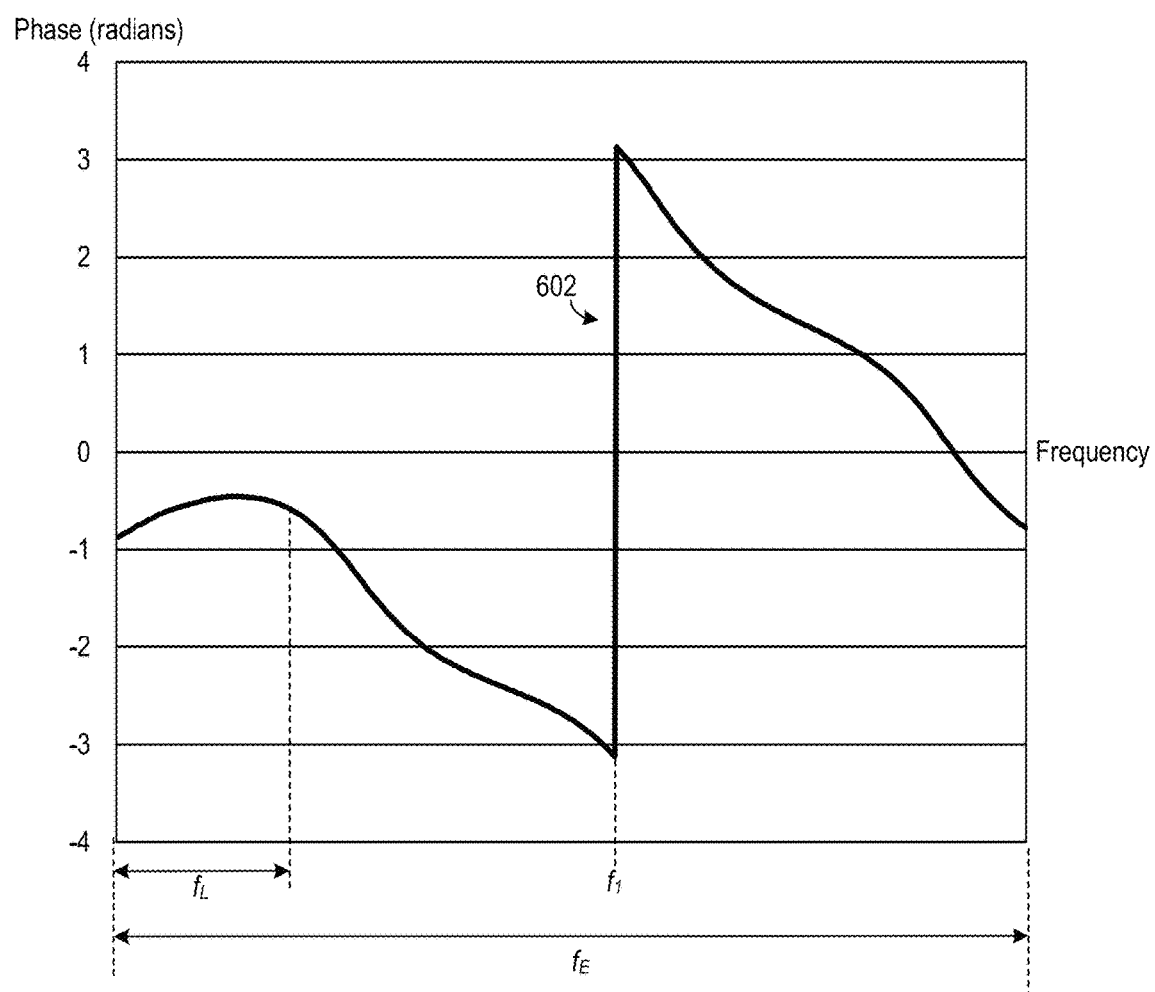
FIG. 6B is a graph of phase versus frequency of the FIG. 6A raw equalizer coefficients.

FIG. 6B is a graph 606 of phase versus frequency of raw equalizer coefficients 602. As evident from FIG. 6B, the time delay included in raw equalizer coefficients 602 causes phase of coefficients 602 to significantly vary as a function of frequency. Furthermore, phase shifts from $-\pi$ to $\pi$ at frequency $f_1$, due to the time delay included in raw equalizer coefficients 602. It should be noted that change in phase versus frequency of raw equalizer coefficients 602 is relatively constant except in a low-frequency portion $f_L$ of a frequency band $f_E$ encompassed by raw equalizer coefficients 602. The varying slope in low frequency portion $f_L$ is due to group delay, and the group delay also causes portion 605 of graph 600 (FIG. 6A) to have an inverted u-shape. The group delay in the low frequency portion $f_L$ is caused, for example, by high-pass filtering of communication link 106 in this frequency portion. While raw equalizer coefficients 602 exhibit group delay only in the low frequency portion $f_L$, in the examples of FIGS. 6A and 6B, group delay is frequently also present in a high-frequency portion of a frequency band encompassed by equalizer coefficients, such as due low-pass filtering in the high-frequency portion.

Referring again to FIG. 5, in a block 504 of method 500, processing subsystem 402 executes linear delay estimation instructions 408 to estimate a linear delay of raw equalizer coefficients 114, where the linear delay is the delay added to raw equalizer coefficients 114 by communication network 100, such as during a ranging process. In one example of block 504, processing subsystem 402 executes linear delay estimation instructions 408 to estimate a linear delay of raw equalizer coefficients 602 of FIGS. 6A and 6B. Linear delay of raw equalizer coefficients 602 can be expressed as the slope of phase versus frequency of the coefficients. Accordingly, in some embodiments, processing subsystem 402 executes linear delay estimation instructions 408 to estimate linear delay from a change in phase of raw equalizer coefficients 602 with respect to frequency. In certain embodiments, processing subsystem 402 excludes portions of raw equalizer coefficients 114 that are affected by group delay, e.g., raw equalizer coefficients 602 of low-frequency portion $f_L$, when estimating linear delay, to avoid erroneously including group delay in the estimated linear delay.

Figure 6C:
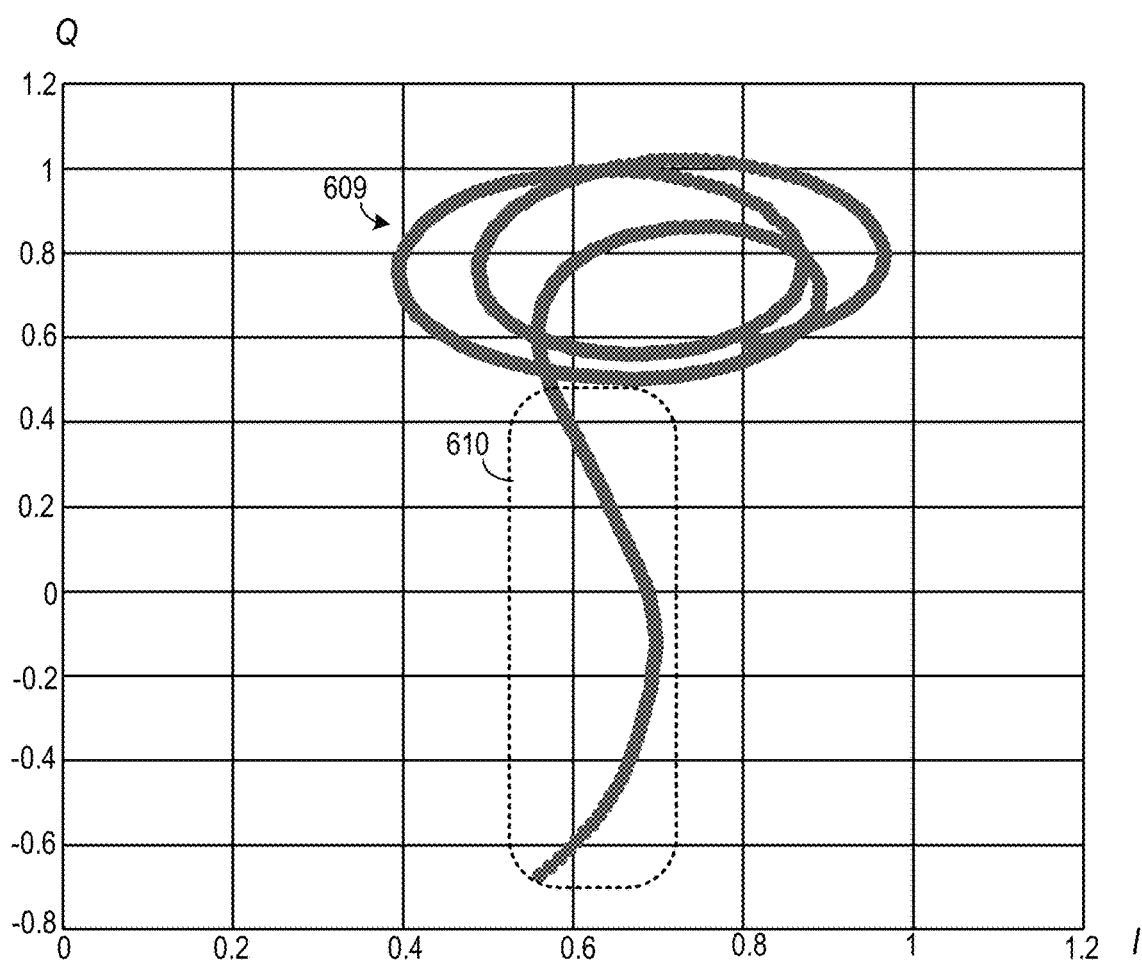
FIG. 6C is a graph of I components versus Q components of the FIG. 6A raw equalizer coefficients after course delay removal.

Referring again to FIG. 5, in a block 506 of method 500, processing subsystem 402 executes course delay removal instructions 410 to substantially remove the linear delay estimated in block 504 from raw equalizer coefficients 114. In some embodiments, however, processing subsystem 402 does not perform course delay removal in portions of raw equalizer coefficients 114 affected by group delay. In one example of block 506, processing subsystem 402 executes course delay removal instructions 410 to flatten phase of raw equalizer coefficients 602 outside of the low-frequency portion $f_L$, by adjusting the equalizer coefficients to offset the estimated linear delay determined in block 506. FIG. 6C is a graph 608 of I versus Q components of equalizer coefficients 609, which are raw equalizer coefficients 602 after course delay removal. As evident when comparing graph 608 (FIG. 6C) to graph 600 (FIG. 6A), the course delay removal significantly decreased variation of the equalizer coefficients, except in a portion 610 of graph 608 which corresponds to the low frequency portion $f_L$ of the frequency band $f_E$ where course delay removal was not performed due to presence of group delay.

Figure 6D:
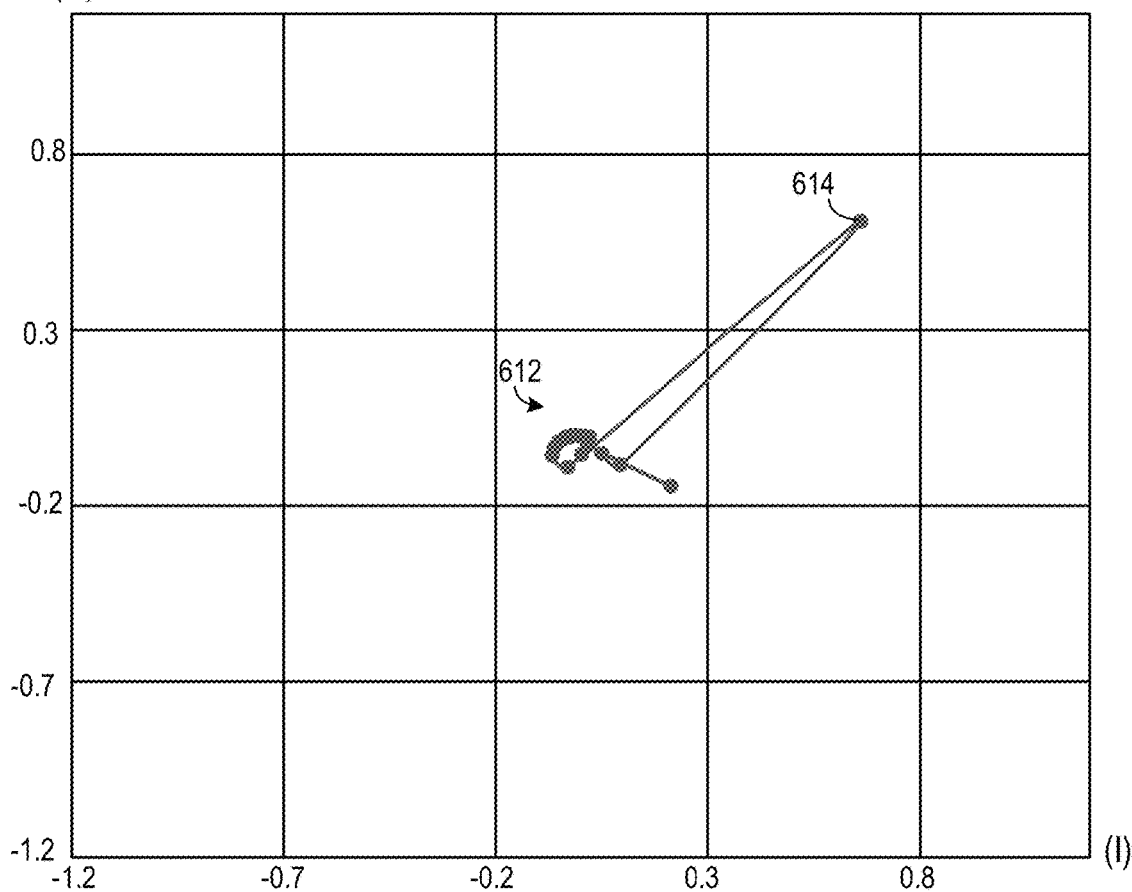
FIG. 6D is a graph of I components versus Q components of the FIG. 6C equalizer coefficients after conversion from the frequency domain to the time domain.

Referring again to FIG. 5, in a block 508 of method 500, processing subsystem 402 executes frequency domain to time domain conversion instructions 412 to convert raw equalizer coefficients 114 from the frequency domain to the time domain, after performing course delay removal of raw equalizer coefficients 114. In some embodiment, instructions 412 include instructions to perform an inverse Fourier transform, such as an inverse fast Fourier transform (IFFT). In one example of block 508, processing subsystem 402 executes frequency domain to time domain conversion instructions 412 to convert the coefficients 609 of FIG. 6C from the time domain to the frequency domain to yield coefficients 612 of FIG. 6D. FIG. 6D is a graph 613 of I versus Q components of the equalizer coefficients 612, which are the same as equalizer coefficients 609 of FIG. 6C but expressed in the time domain instead of in the frequency domain.

Referring again to FIG. 5, in a block 510 of method 500, processing subsystem 402 executes phase determination instructions 414 to determine a phase of a direct current (DC) equalizer coefficient of the time domain equalizer filter coefficient from block 508. In one example of block 510, processing subsystem 402 executes phase determination instructions 414 to determine a phase of a DC equalizer coefficient 614 of the FIG. 6D time domain equalizer coefficients 612.

Figure 6E:
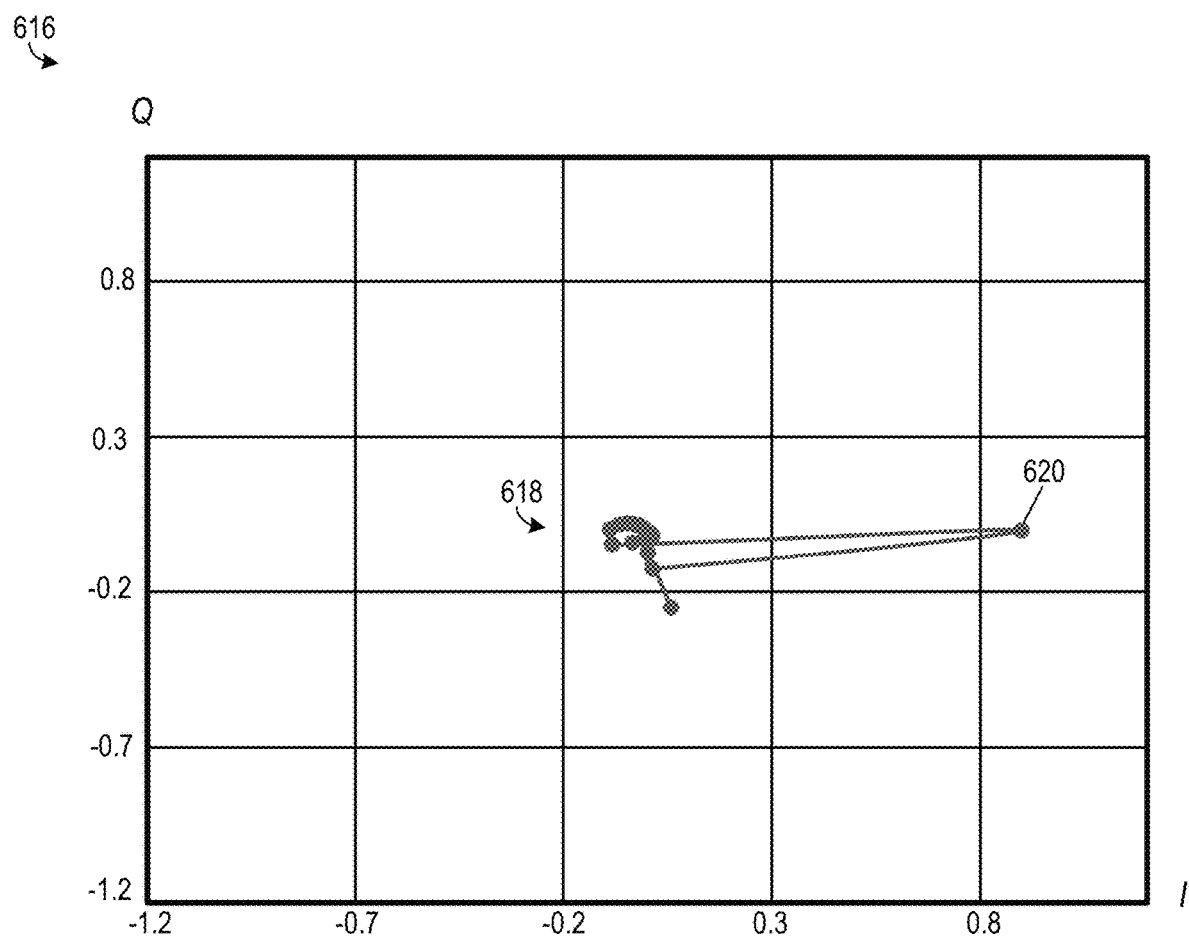
FIG. 6E is a graph of I components versus Q components of the FIG. 6D equalizer coefficients after phase rotation to yield corrected equalizer coefficients.

Referring again to FIG. 5, in a block 512 of method 500, processing subsystem 402 executes phase correction instructions 416 to rotate phase of all time domain equalizer coefficients by the phase determined in block 510, to yield corrected equalizer coefficients 116. Consequently, the DC equalizer coefficient has a phase of zero, or in other words, the DC equalizer coefficient has a Q component of zero magnitude, after executing block 512. In one example of block 512, processing subsystem 402 executes phase correction instructions 416 to rotate phase of all time domain equalizer coefficients 612 of FIG. 6D to yield corrected equalizer coefficients 618 of FIG. 6E. FIG. 6E is a graph 616 I versus Q components of corrected equalizer coefficients 618 in the time domain, where corrected equalizer coefficients 618 are the same as equalizer coefficients 612 of FIG. 6D but rotated by the phase determined in block 510. FIG. 6E indicates a DC equalizer coefficient 620, which is the same as DC equalizer coefficient 614 (FIG. 6D) after rotation by the phase determined in block 510. As evident from FIG. 6E, DC equalizer coefficient 620 has a Q component of zero magnitude, such that DC equalizer coefficient 620 has a phase of zero. Additionally, the remaining (higher order) coefficients of corrected equalizer coefficients 618 have respective phases that are relative to the zero phase of DC equalizer coefficient 620. As such, corrected equalizer coefficients 618 are suitable for analysis to determine properties of communication link 106.

Figure 6F:
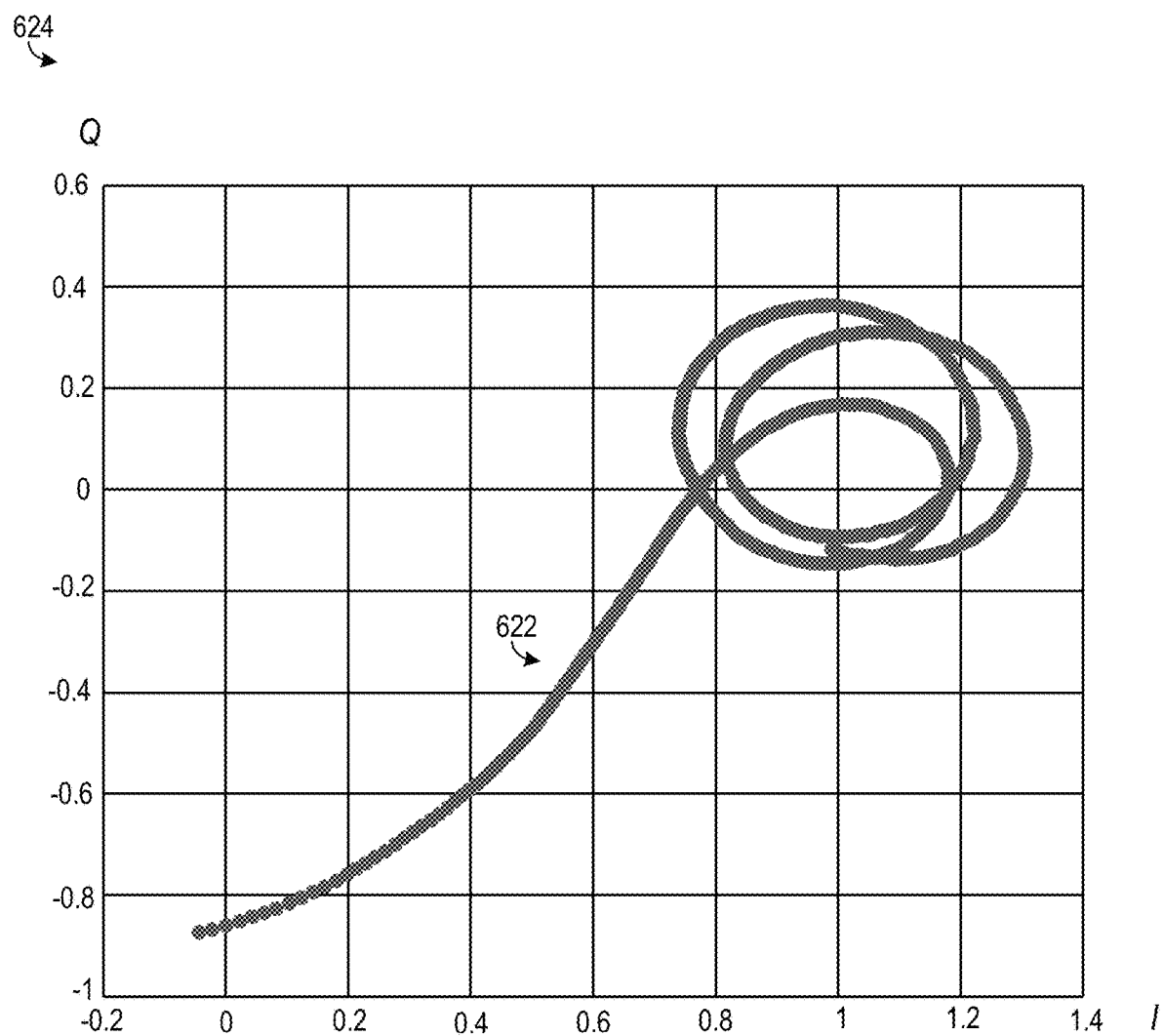
FIG. 6F is a graph of I components versus Q components of the FIG. 6E corrected equalizer coefficients after conversion from the time domain to the frequency domain.
Figure 6G:
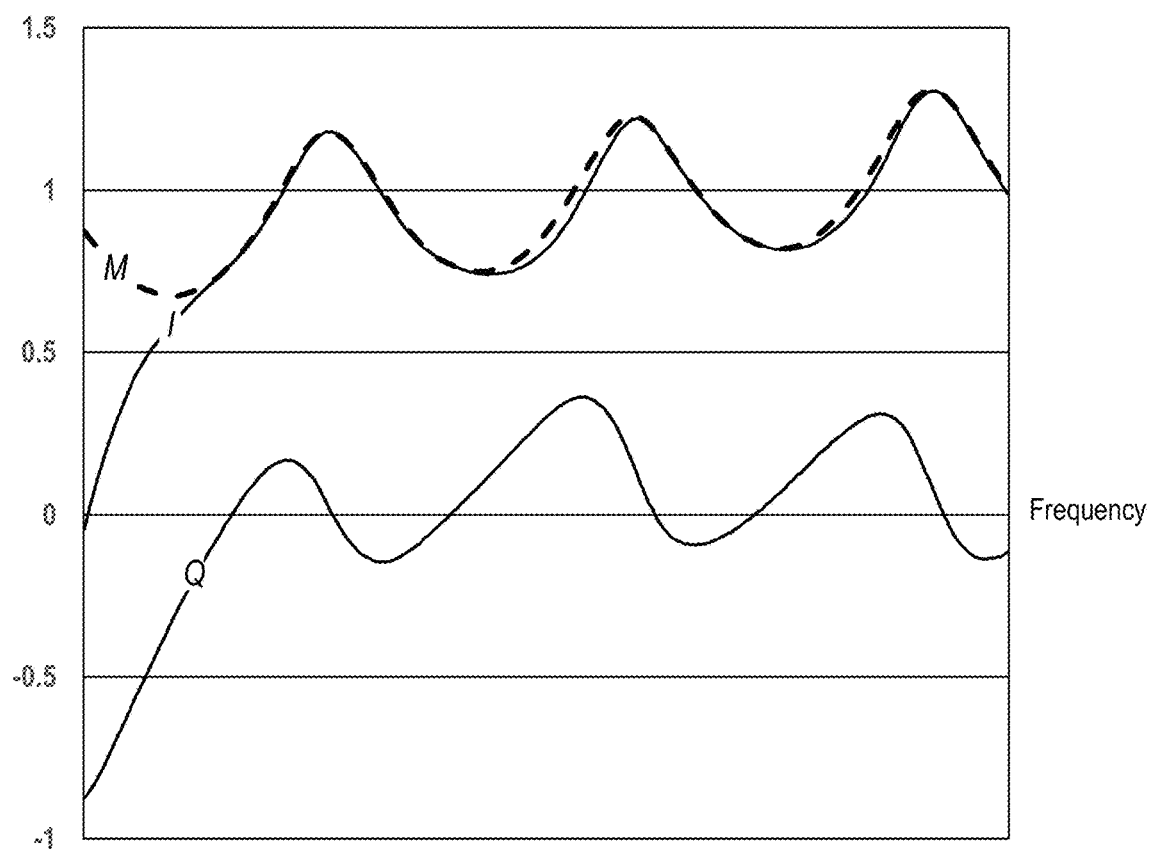
FIG. 6G is a graph of frequency versus magnitude of the I components, the Q components, and the magnitude, of the FIG. 6E corrected equalizer coefficients after conversion from the time domain to the filter domain.

Corrected equalizer coefficients 618 are in the time domain after execution of block 512. However, there may be situations where it is desirable to have corrected equalizer coefficients in the frequency domain, such as to assist in determining certain impairments of communication link 106 that cannot be readily determined from the time domain. Accordingly, method 500 of FIG. 5 optionally includes a block 514 where processing subsystem 402 executes time domain to frequency domain conversion instructions 418 to convert corrected equalizer coefficients 116 from the time domain to the frequency domain. In one example of block 514, processing subsystem 402 executes time domain to frequency domain conversion instructions 418 to convert corrected equalizer coefficients 618 (FIG. 6E) from the time domain to the frequency domain to yield corrected equalizer coefficients 622 of FIGS. 6F and 6G. FIG. 6F is a graph 624 I versus Q components of corrected equalizer coefficients 622, where corrected equalizer coefficients 622 are the same as corrected equalizer coefficients 618 of FIG. 6E but expressed in the frequency domain instead of in the time domain. FIG. 6G is graph of frequency versus magnitude of each of (a) the I components of corrected equalizer coefficients 622, (b) the Q components of corrected equalizer coefficients 622, and (c) the magnitude (M) of corrected equalizer coefficients 622.

Referring again to FIG. 5, method 500 optionally further includes a block 516 where processing subsystem 402 executes normalization instructions 420 to normalize corrected equalizer coefficients 116 in the time domain and/or frequency domain. For example, in some embodiments, processing subsystem 402 executes normalization instructions 420 to normalize corrected equalizer coefficients 116 such that (a) total power of corrected equalizer coefficients 116 is equal to one or (b) the DC tap of corrected equalizer coefficients 116 is equal to one. In one example of block 516, processing subsystem 402 executes normalization instructions 420 to normalize corrected equalizer coefficients 622 such that an amplitude of the DC coefficient of corrected equalizer coefficients 622 is equal to one.

Figure 7:
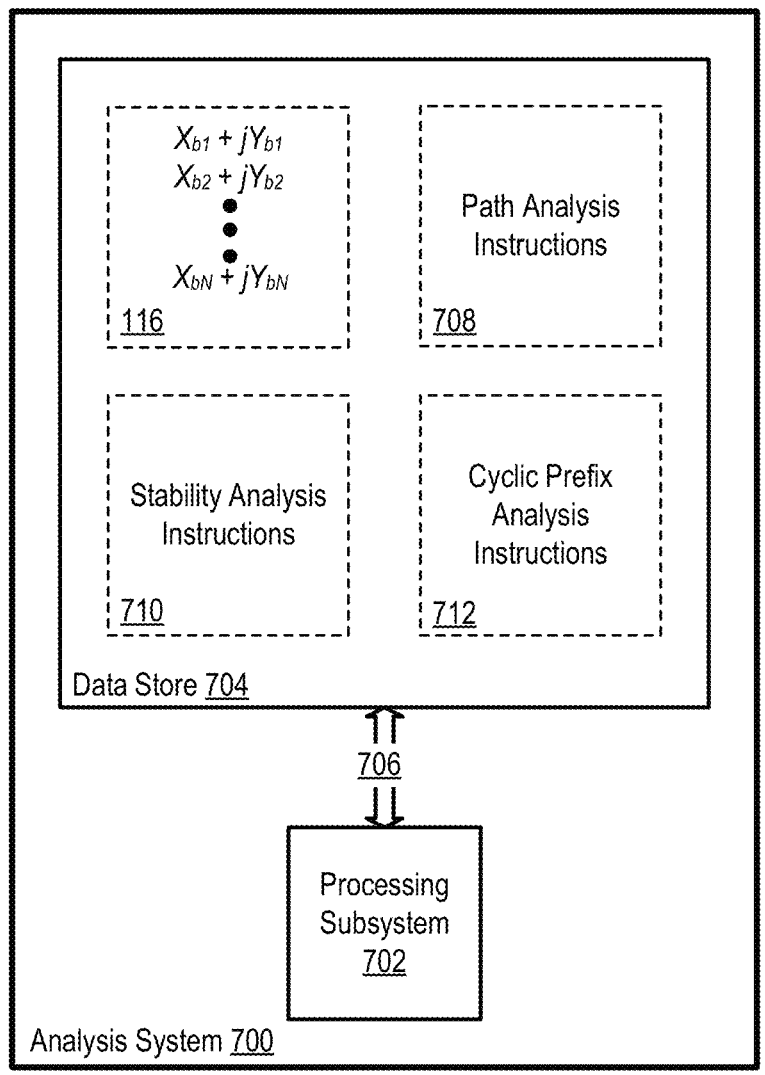
FIG. 7 is a block diagram of one embodiment of an analysis system of the FIG. 1 communication network.

Referring again to FIG. 1, optional analysis system 110 is configured to determine one or more properties 118 of communication link 106 at least partially based on corrected equalizer coefficients 116, where corrected equalizer coefficients 116 are in the time domain and/or the frequency domain. FIG. 7 is a block diagram of an analysis system 700, which is one possible embodiment of analysis system 110 of FIG. 1, although it is understood that analysis system 110 is not limited to being embodied according to the FIG. 7 example.

Analysis system 700 includes a processing subsystem 702 and a data store 704. Processing subsystem 702 is communicatively coupled 706 to data store 704, and processing subsystem 702 is configured to execute instructions stored in data store 704 to perform the functions of analysis system 110, as discussed below. Although each of processing subsystem 702 and data store 704 is illustrated as being a single element, one or more of processing subsystem 702 and data store 704 could be formed of multiple constituent elements that need not be commonly located. For example, in some embodiments, processing subsystem 702 and data store 704 are embodied by a distributed computing system, such as a cloud computing system, including (a) multiple processors collectively implementing processing subsystem 702 and (b) multiple data storage devices, e.g., memory devices and/or hard drives, collectively implementing data store 704. Additionally, while FIG. 7 depicts processing subsystem 702 and data store 704 as being separate elements, processing subsystem 702 and data store 704 could be at least partially combined without departing from the scope hereof. Furthermore, in some alternate embodiments, analysis system 700 is at least partially integrated with correction system 400 (FIG. 4). For example, in certain embodiment embodiments, correction system 400 and analysis system 700 share a common processing subsystem and/or a common data store.

Data store 704 temporarily stores corrected equalizer coefficients 116, as received from correction system 108. Corrected equalizer coefficients 116 represent, for example, a channel response of communication link 106 or an inverse of a channel response of a communication link 106, as discussed above. In embodiments where corrected equalizer coefficients 116 represent a channel response of communication link 106, analysis system 700 may directly analyze corrected equalizer coefficients 116, while in embodiments where corrected equalizer coefficients 116 represent an inverse of a channel response of communication link 106, analysis system 700 may analyze an inverse of corrected coefficients 116. Data store 704 further includes one or more of the following instructions: path analysis instructions 708, stability analysis instructions 710, and cyclic prefix analysis instructions 712. The actual instructions included in data store 704 are implementation dependent and may depend, for example, on the intended capabilities of analysis system 700.

Processing subsystem 702 is configured to execute path analysis instructions 708 to determine one or more linear impairments of communication link 106 at least partially from corrected equalizer coefficients 116. Additionally, Applicant has found that non-linear impairments are often accompanied by a linear impairment. Accordingly, certain embodiments of path analysis instructions 708 enable analysis system 700 to determine or more non-linear impairments at least partially from linear impairments.

Discussed below are several examples of how certain embodiments of analysis system 700 identify a linear impairment of communication link 106. However, path analysis instructions 708 are implementation dependent, and analysis system 700 could accordingly be configured to determine alternative and/or additional linear impairments of communication link 106 without departing from the scope hereof.

Figure 8:
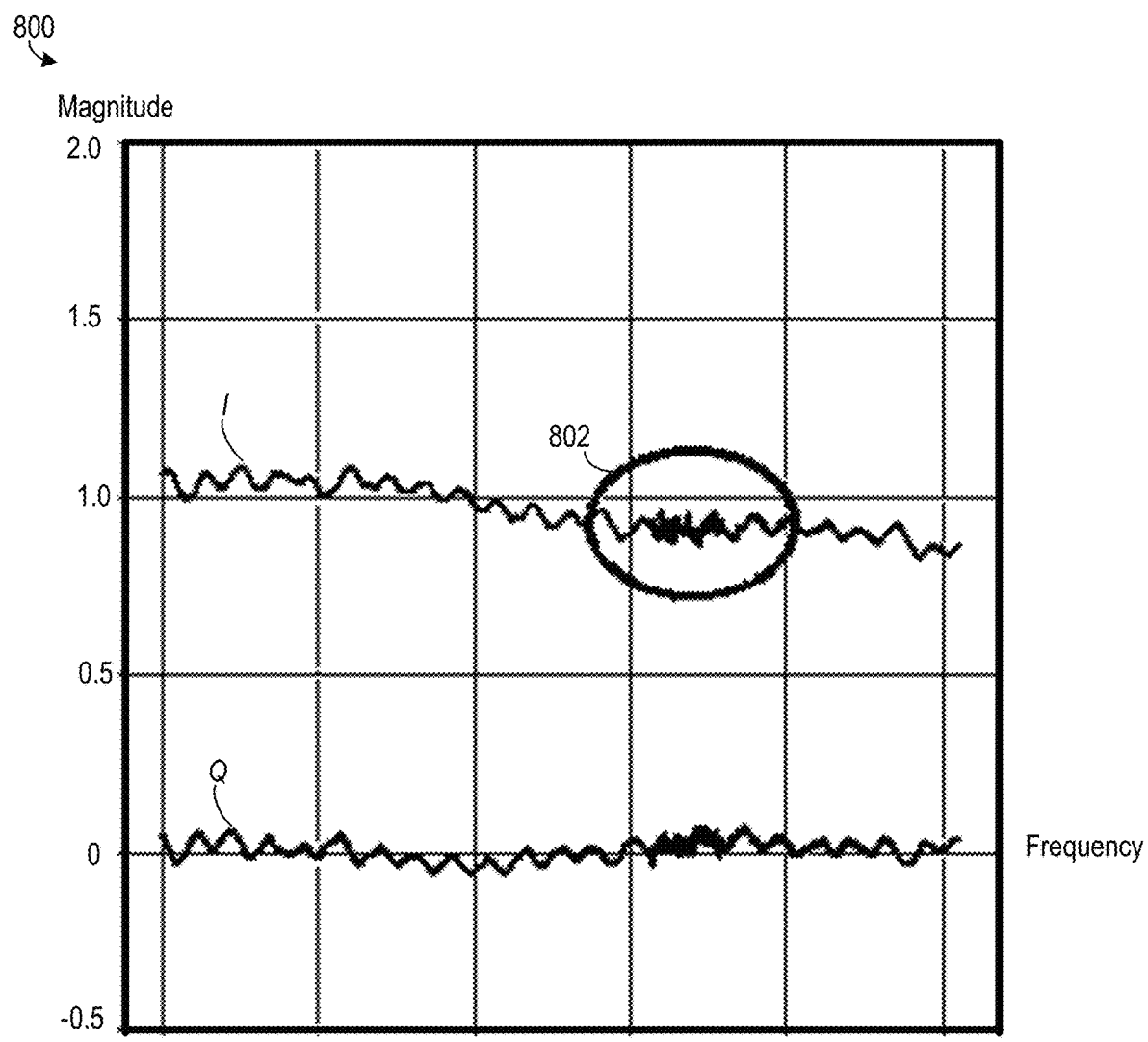
FIG. 8 is a graph of I components versus Q components of example corrected equalizer coefficients indicating presence of interference from ingress of cellular wireless communication signals in an embodiment of the FIG. 1 communication network.

FIG. 8 is a graph 800 of frequency versus magnitude of an embodiment of communication network 100 where (a) communication link 106 includes an electrical cable and (b) a defect in the electrical cable has enabled ingress of LTE cellular wireless communication signals. Graph 800 includes respective curves representing the I and Q components of corrected equalizer coefficients 116 in the frequency domain. The ingress of LTE cellular wireless communication signals is evident by the high frequency ripple in portion 802 of the I component of corrected equalizer coefficients 116. Accordingly, particular embodiments of analysis system 700 are configured to determine this ingress impairment from presence of the high frequency ripple in portion 802 of the I component.

The ripple due to ingress in the FIG. 8 example occurs over a relatively small frequency band of corrected equalizer coefficients 116. Ripple over a wider bandwidth may indicate a different type of interference, such as common path distortion (CPD) interference or passive inter-modulation (PIM) interference. Accordingly, some embodiments of analysis system 700 are configured to distinguish among possible interference sources at least partially according to bandwidth of detected ripple in the frequency domain of corrected equalizer coefficients 116.

Figure 9:
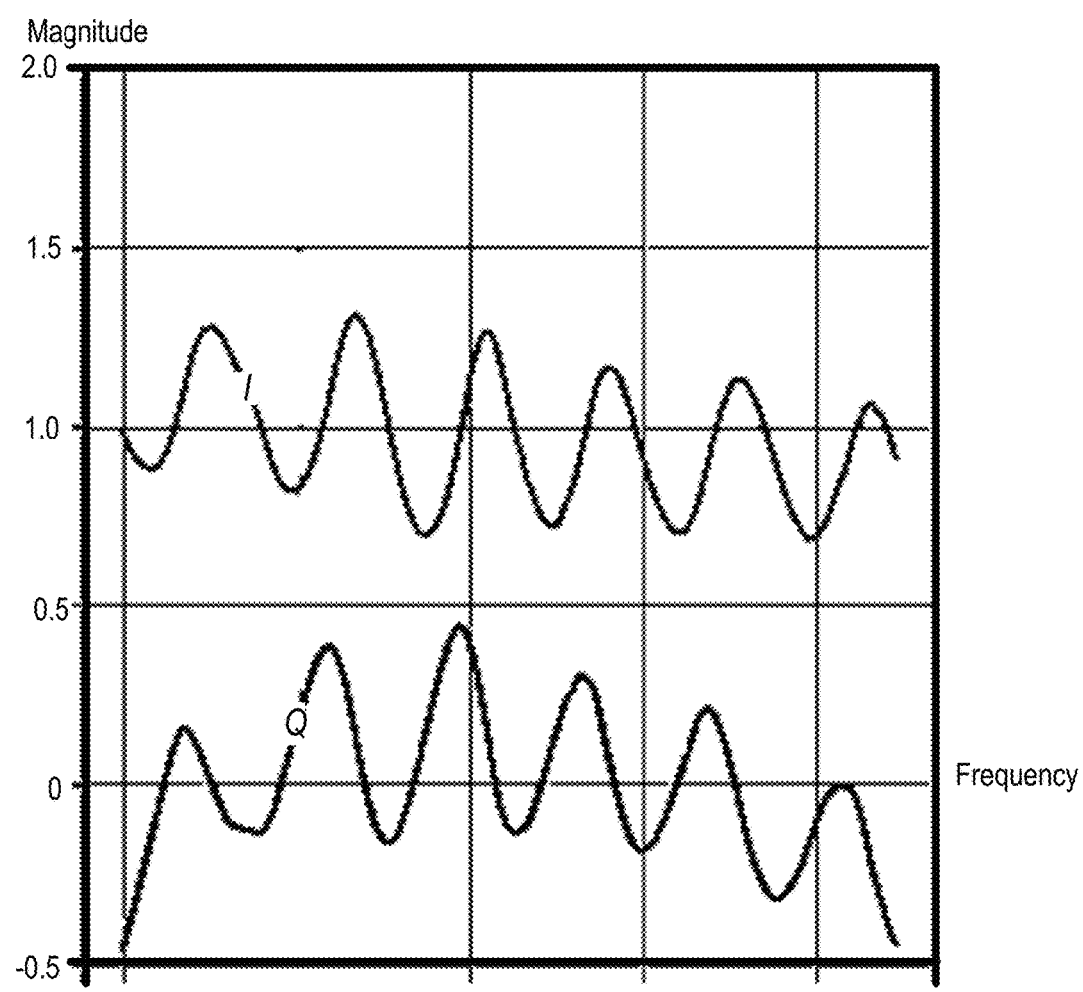
FIG. 9 is a graph of magnitude of I components and Q components of example corrected equalizer coefficients indicating presence of a standing wave impairment in an embodiment of the FIG. 1 communication network.

FIG. 9 is a graph 900 of frequency versus magnitude of an embodiment of communication network 100 where communication link 106 exhibits a standing wave impairment. Graph 900 includes respective curves representing the I and Q components of corrected equalizer coefficients 116 in the frequency domain. The standing wave impairment is evident from the relatively large magnitude and low frequency ripple of both of the I and Q components. Accordingly, particular embodiments of analysis system 700 are configured to determine this standing wave impairment from high magnitude and low frequency ripple in the frequency domain of corrected equalizer coefficients 116.

Figure 10:
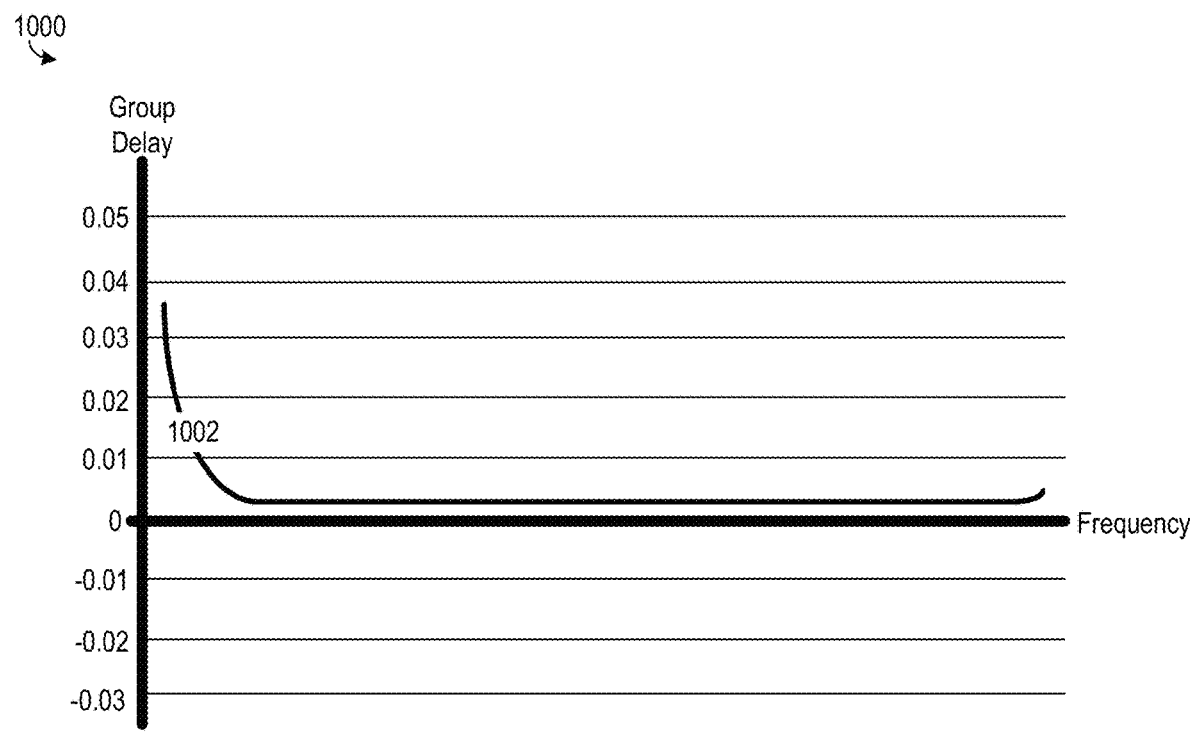
FIG. 10 is a graph illustrating an example of group delay as a function of frequency in an embodiment of FIG. 1 communication network.

In some embodiments, processing subsystem 702 is configured to execute path analysis instructions 708 to determine group delay of communication link 106 based on slope of the phase response of communication link 106, as expressed by corrected equalizer coefficients 116. For example, FIG. 10 is a graph 1000 illustrating an example of group delay as a function of frequency that is determined by analysis system 700 by (a) determining the phase response of communication link 106 from corrected equalizer coefficients 116 and (b) taking the derivative of the phase response with respect to frequency, to obtain the group delay as expressed by curve 1002. As shown in the FIG. 10 example, there is significant group delay in the low end of the frequency band encompassed by FIG. 10, such as due to high pass filtering in this portion of the frequency band. Group delay also begins to increase at the high end of the frequency band encompassed by FIG. 10, such as due to presence of low pass filtering in this portion of the frequency band.

Figure 11:
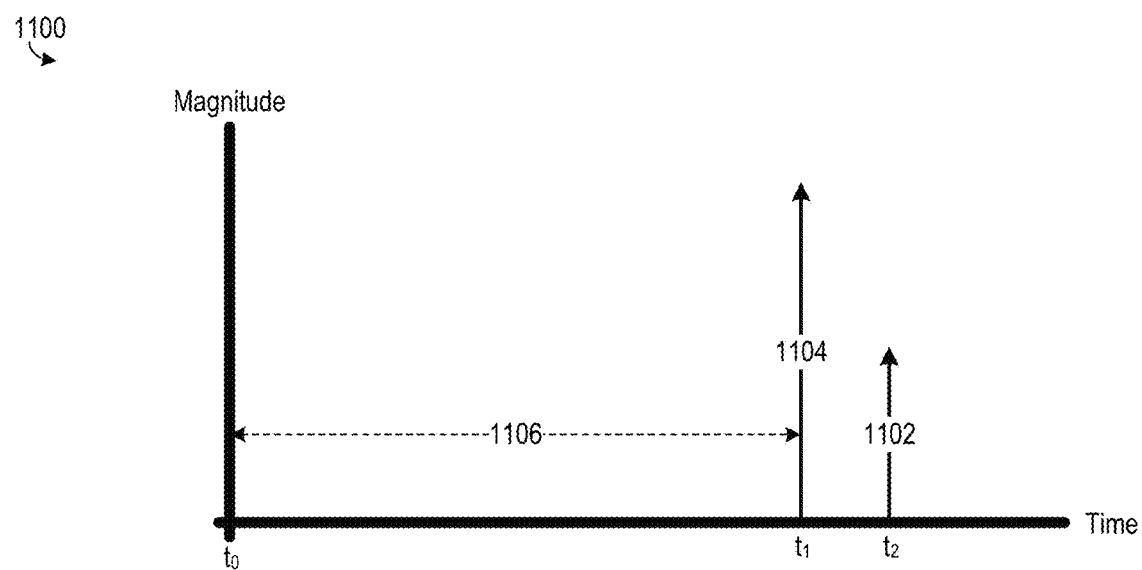
FIG. 11 is graph illustrating an example of magnitude of reflections as a function of time in an embodiment of the FIG. 1 communication network including an impairment which causes a reflection.

In certain embodiments, processing subsystem 702 is configured to execute path analysis instructions 708 to determine a location of an impairment in communication medium by analyzing corrected equalizer coefficients 116 in the time domain. For instance, FIG. 11 is a graph 1100 of reflection magnitude versus time in one example embodiment of communication system 100 where communication link 106 includes an impairment causing a reflection. In this example embodiment, transmitter 102 transmits communication signal 112 to receiver 104 at time $t_0$. Receiver 104 generates a reflection 1102 in response to communication signal 112, and reflection 1102 is received by transmitter 102 at time $t_2$. An impairment in communication link 106 also generates a reflection 1104 in response to communication signal 112, and reflection 1104 is received by transmitter 102 at time $t_1$.

In this example embodiment, processing subsystem 702 executes path analysis instructions 708 to generate the data of graph 1100 from corrected equalizer coefficients 116. Additionally, processing subsystem 702 executes path analysis instructions 708 to identify reflection 1104 as being due to an impairment of communication link 106, instead of being a normal reflection of communication signal 112 by receiver 104, such as from the magnitude of reflection 1104 exceeding a threshold value and/or transmitter 102 receiving reflection 1104 before receiving reflection 1102. Furthermore, processing subsystem 702 executes path analysis instructions 708 to identify the location of the impairment in communication medium 106 at least partially based on a difference 1106 between times $t_1$ and $t_0$. For example, processing subsystem 702 may divide difference 1106 by a speed of transmission of communication signal 112 through communication link 106, to determine a distance of the impairment from transmitter 102. In embodiments where communication signal 112 is a multi-carrier communication signal, the large number equalizer coefficients associated with the multi-carrier communication signal may advantageously enable analysis system 700 to determine the location of the impairment in communication link 106 with high precision, relative to determining the location from equalizer coefficients associated with a single-carrier communication signal.

Figure 12:
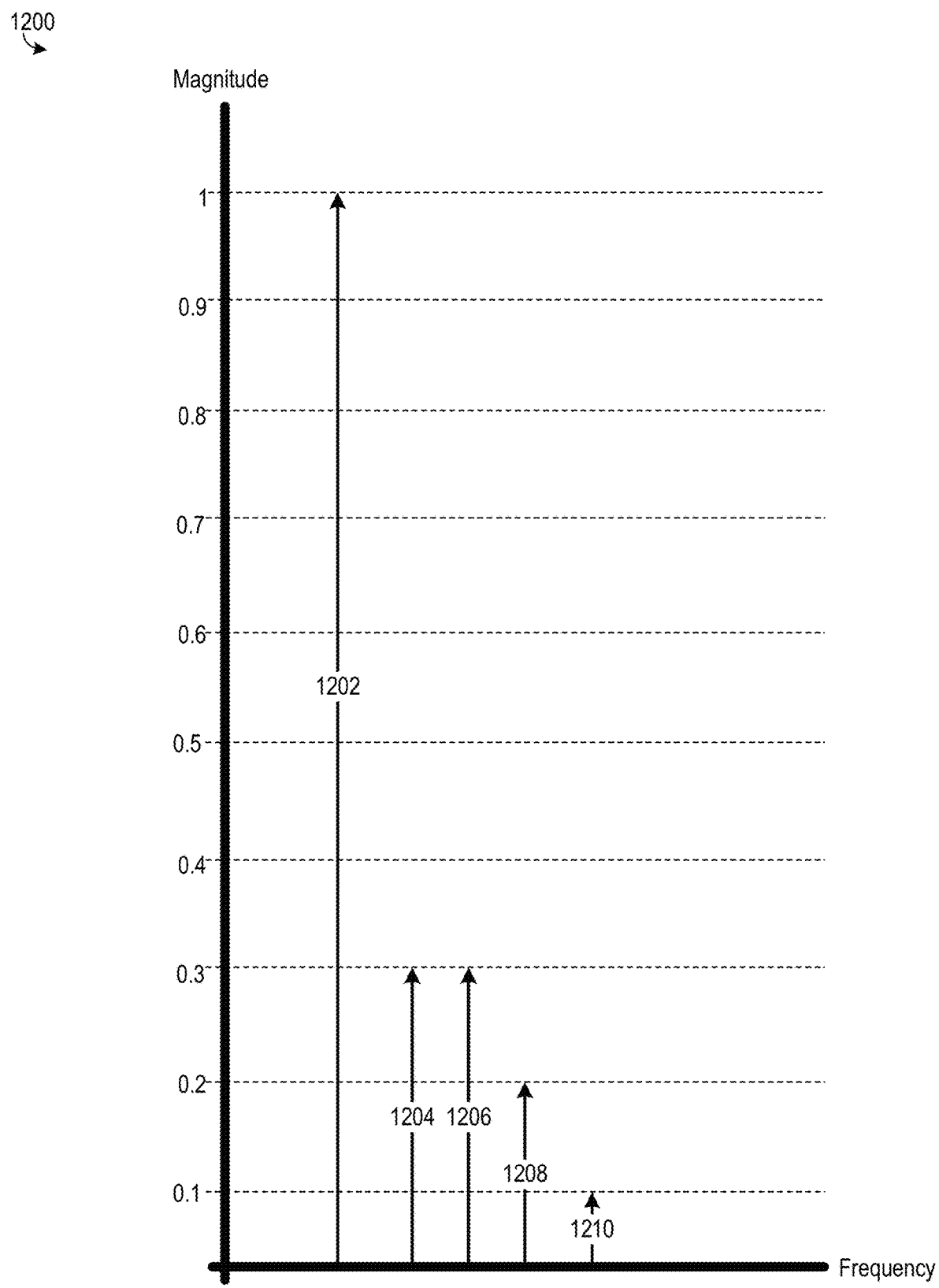
FIG. 12 is a graph illustrating an example of magnitude of corrected equalizer coefficients versus frequency in an embodiment of the FIG. 1 communication network including an impairment that is being compensated by use of equalization.

Moreover, some embodiments of processing subsystem 702 are configured to execute path analysis instructions 708 to quantitively determine an impairment of communication link 106 from a relationship between (a) a magnitude of the DC equalizer coefficient of corrected equalizer coefficients 116 and (b) total magnitude of all other corrected equalizer coefficients 116. For example, FIG. 12 is a graph 1200 of magnitude versus time of corrected equalizer coefficients 116 in the time domain, in another example embodiment of communication network 100. In this example embodiment, corrected equalizer coefficients 116 include a DC equalizer coefficient 1202 and higher order equalizer coefficients 1204, 1206, 1208, and 1210. The magnitude of each equalizer coefficient in FIG. 12 is determined by (a) summing the square of the I component of the coefficient and the square of the Q component of the coefficient and (b) taking the square root of the resulting sum. In this example, the equalizer coefficients are normalized such that DC equalizer coefficient 1202 has a magnitude of one.

In this example embodiment, processing subsystem 702 executes path analysis instructions 708 to determine a ratio $R_1$ of the magnitude of DC equalizer coefficient to the sum of magnitudes of all equalizer coefficients 1202, 1204, 1206, 1208, and 1210. In particular, equalizer coefficients 1202, 1204, 1206, 1208, and 1210 have respective magnitudes of 1, 0.3, 0.3, 0.2, and 0.1, and processing subsystem 702 accordingly determines ratio $R_1$ as follows:

$$R_1 = \frac{1}{1 + 0.3 + 0.3 + 0.2 + 0.1} = 0.53 \qquad \text{(EQN. 1)}$$

Magnitude of ratio $R_1$ will be unity in cases where communication link 106 has no impairment that is being compensated by equalization, and magnitude of ratio $R_1$ decreases with increasing use of equalization to compensate for linear distortion of communication link 106. As such, magnitude of ratio $R_1$ generally decreases with increasing linear distortion of communication link 106. Ratio $R_1$ is equal to 0.53 in the FIG. 12 example scenario, which indicates that communication link 106 has one or more impairments that are being compensated for by equalization. In some embodiments, processing subsystem 702 executes path analysis instructions 708 to determine a relative impairment of communication link 106 based on a magnitude of ratio $R_1$, such as by comparing magnitude of ratio $R_1$ to one or more threshold values indicating relative distortion of communication link 106. For example, in a particular embodiments, processing subsystem 702 determines that (a) impairment of communication link 106 is minimal if a magnitude of ratio $R_1$ is below a first threshold value, (b) impairment of communication link 106 is moderate if a magnitude of ratio $R_1$ is greater than or equal to the first threshold value but less than a second threshold value, and (c) impairment of communication link 106 is high if a magnitude of ratio $R_1$ is greater than or equal to the second threshold value.

It should be noted that the definition of ratio $R_1$ may vary as long as it indicates a relationship between the magnitude of DC corrected equalizer coefficients and the other corrected equalizer coefficients. For example, ratio $R_1$ could be inverted such that magnitude of ratio $R_1$ increases with increasing linear distortion of communication link 106.

Referring again to FIG. 7, processing subsystem 702 is configured to execute stability analysis instructions 710 to perform stability analysis of communication link 106 by characterizing change in corrected equalizer coefficients 116 over time. Significant changes in corrected equalizer coefficients 116 over time may indicate that communication link 106 is unstable. For example, thermally-caused intermittent problems may cause corrected equalizer coefficients 116 to change daily, and wind-induced or traffic-induced vibrations may cause corrected equalizer coefficients 116 to change several times per second. Accordingly, in some embodiments, stability analysis instructions 710 cause analysis system 700 to (a) repeatedly compare current corrected equalizer coefficients 116 to previous corrected equalizer coefficients 116 to detect a change in the coefficients 116 and (b) identify instability in communication link 106 from change in corrected equalizer coefficients 116. Additionally, some embodiments of analysis system 700 are configured to classify type of instability from frequency of change in corrected equalizer coefficients 116 and/or magnitude of change in corrected equalizer coefficients 116. For example, some embodiments are configured to (a) classify instability of communication link 106 as being thermally induced instability in response to frequency of change in corrected equalizer coefficients 116 being less than or equal to a threshold value and (b) classify instability of communication link 106 as being mechanically induced instability in response to frequency of change in corrected equalizer coefficients 116 being greater than the threshold value.

Figure 13:
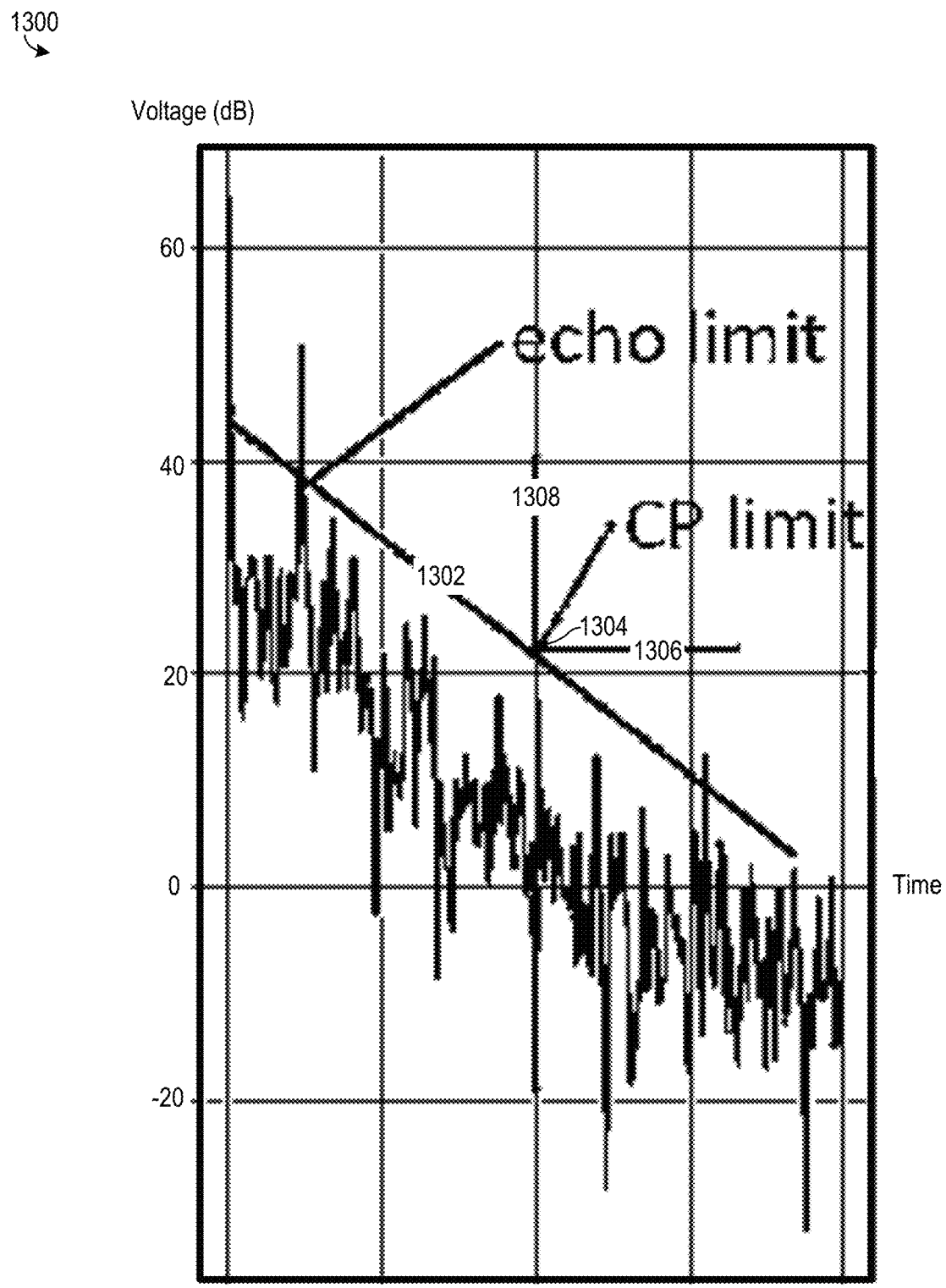
FIG. 13 is a graph of example corrected equalizer coefficients in the time domain and indicating presence of an echo in an embodiment of the FIG. 1 communication network.

Referring again to FIG. 7, processing subsystem 702 is configured to execute cyclic prefix analysis instructions 712 to determine if a selected cyclic prefix is sufficiently long to accommodate a longest echo in communication link 106 that is being corrected. For example, FIG. 13 is a graph 1300 of example corrected equalizer coefficients 116 in the time domain of an embodiment of communication network 100 where communication link 106 exhibits echo. Spikes in the FIG. 13 time domain response may indicate reflections or echoes on communication link 106. Graph 1300 further includes (a) a line 1302 representing an echo limit and (b) a horizontal line 1306 and vertical line 1308 intersecting at a CP limit 1304. The echo limit of line 1302 represents a maximum permissible value of echoes in this embodiment of communication network 100. An excursion of corrected equalizer coefficients 116 above line 1302 indicates a possible problem with communication link 106 causing excessive echo magnitude.

CP limit 1304, on the other hand, represents a maximum ability of a cyclic prefix to accommodate echoes in communication link 106. In particular, the cyclic prefix is sufficiently long to accommodate any echoes represented by corrected equalizer coefficients 116 to the left of vertical line 1308 intersecting CP limit 1304. Additionally, any echoes represented by corrected equalizer coefficients 116 that do not extend above horizontal line 1306 intersecting CP limit 1304 are sufficiently weak to not cause performance problems with communication link 106. Accordingly, particular embodiments of processing subsystem 702 are configured to execute cyclic prefix analysis instructions 712 to (a) determine that a cyclic prefix implemented by communication link 106 is sufficient to address anticipated echoes in communication link 106 if none of corrected equalizer coefficients 116 extend into the upper right quadrant of graph 1300 delineated by horizontal line 1306 and vertical line 1308 and (b) determine that the cyclic prefix implemented by communication link 106 is insufficient to address anticipated echoes in communication link 106 if the aforementioned condition is not met. Additionally, some embodiments of analysis system 700 are configured to determine presence of an excessive echo in response to one or more equalizer coefficients 116 extending above line 1302.

While the above discussion focusses on analyzing a single communication link via its corrected equalizer coefficients, valuable information can also be obtained from corrected equalizer coefficients associated with two or more communication links. For example, corrected equalizer coefficients from a plurality of different communication links can be compared to determine if the different communication links are affected by a common impairment and/or if the different communication links are served by common communication network infrastructure.

Figure 14:
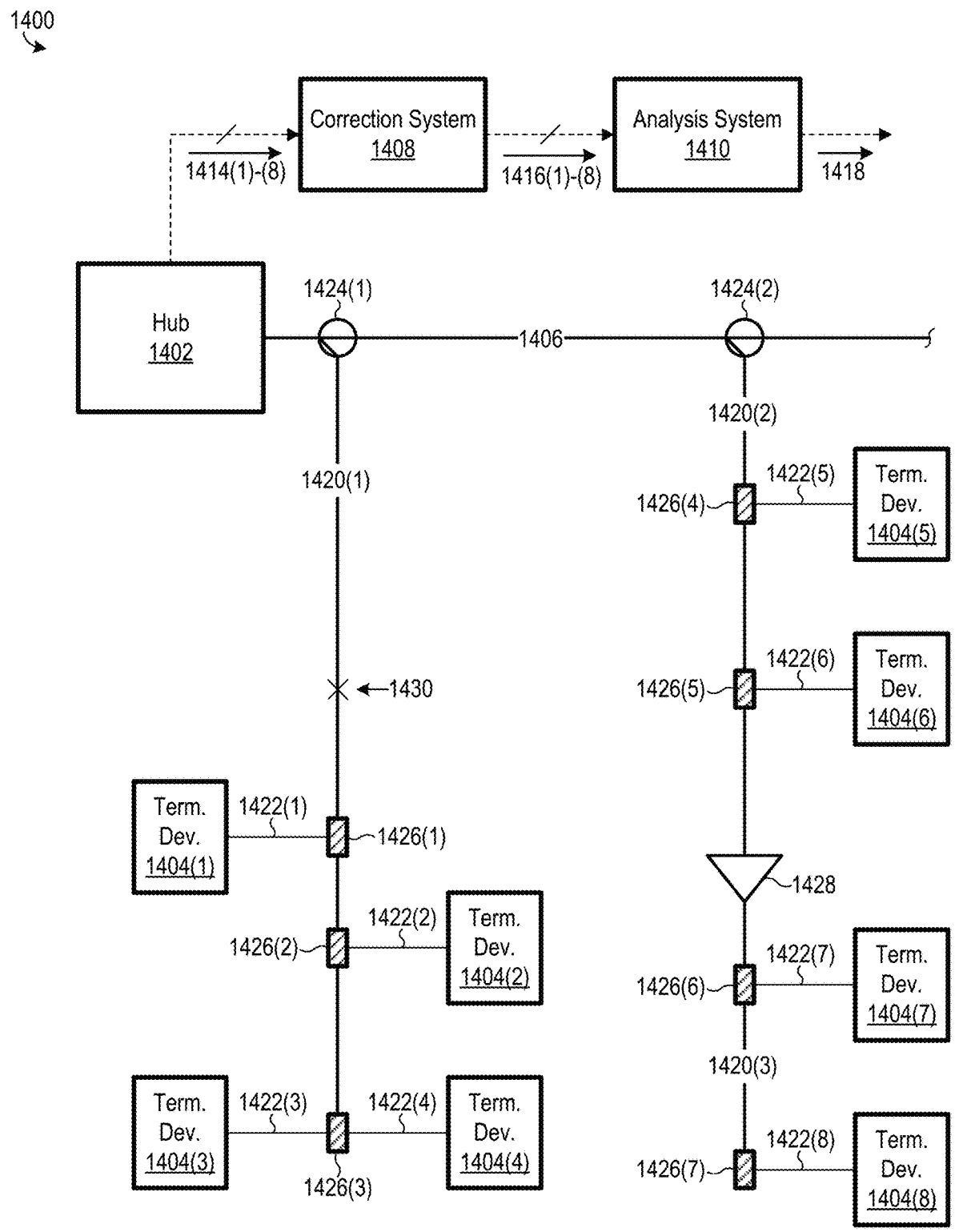
FIG. 14 is a block diagram of a communication network configured to leverage corrected equalizer coefficients from a plurality of communication links, according to an embodiment.

FIG. 14 is a block diagram of a communication network 1400 which is configured to leverage corrected equalizer coefficients from a plurality of communication links. Communication network 1400 includes a hub 1402, a plurality of termination devices 1404, a main cable 1406, a correction system 1408, an analysis system 1410, branch cables 1420, drop cables 1422, splitters 1424, taps 1426, and an amplifier 1428. In this document, specific instances of an item may be referred to by use of a numeral in parentheses (e.g., termination device 1404(1)) while numerals without parentheses refer to any such item (e.g., termination devices 1404).

The following discussion discusses communication network 1400 primarily in the context of it being a cable communication network, such as a cable communication network operating according to a Data Over Cable Service Interface Specification (DOCSIS) standard. However, communication network 1400 is not limited to being a cable communication network. For example, some embodiments of communication network 1400 are configured as an optical communication network, such as operating according to an Ethernet passive optical network (EPON) standard, a radio frequency of over glass (RFOG or RFoG) standard, or a Gigabit-capable passive optical network (GPON) standard. As another example, main cable 1406, one or more branch cables 1420, and/or one or more drop cables 1422 could be replaced with a wireless communication link, including but not limited to a Wi-Fi wireless communication link, a cellular wireless communication link (e.g., a LTE, 5 G, or 6 G cellular wireless communication link), a satellite wireless communication link (e.g., a VLEO, LEO, MEO, or GEO satellite wireless communication link), a Bluetooth wireless communication link, a LoRa wireless communication link, and/or a Zigbee wireless communication link.

Hub 1402 includes, for example, a modem termination system (MTS) (e.g., a cable modem termination system (CMTS), a fiber node, an optical line terminal (OLT), a digital subscriber line access multiplexer (DSLAM), a network switch, a wireless core network, a network router, and/or a network controller. Each termination device 1404 includes, for example, a modem (e.g., a cable modem (CM), a wireless modem (e.g., a Wi-Fi wireless modem, a cellular wireless modem, or a satellite wireless modem), or a digital subscriber line (DSL) modem), an optical network termination (ONT), an optical network unit (ONU), a wireless access point, and/or user equipment.

Each termination device 1404 is communicatively coupled to hub 1402 via main cable 1406, a splitter 1424, one or more branch cables 1420, a tap 1426, and a drop cable 1422. Specifically, branch cable 1420(1) is communicatively coupled to main cable 1406 via splitter 1424(1). Termination device 1404(1) is communicatively coupled to branch cable 1420(1) via tap 1426(1) and drop cable 1422(1), and termination device 1404(2) is communicatively coupled to branch cable 1420(1) via tap 1426(2) and drop cable 1422(2). Each of termination devices 1404(3) and 1404(4) is communicatively coupled to branch cable 1420(1) via common tap 1426(3) and respective drop cables 1422(3) and 1422(4).

Branch cable 1420(2) is communicatively coupled to main cable 1406 via splitter 1424(2). Termination device 1404(5) is communicatively coupled to branch cable 1420(2) via tap 1426(4) and drop cable 1422(5), and termination device 1404(6) is communicatively coupled to branch cable 1420(2) via tap 1426(5) and drop cable 1422(6). Branch cable 1420(3) is communicatively coupled to branch cable 1420(2) via amplifier 1428. Termination device 1404(7) is communicatively coupled to branch cable 1420(3) via tap 1426(6) and drop cable 1422(7), and termination device 1404(8) is communicatively coupled to branch cable 1420(3) via tap 1426(7) and drop cable 1422(8). Accordingly, termination devices 1404(5) and 1404(6) are upstream of amplifier 1428, and termination devices 1404(7) and 1404(8) are downstream of amplifier 1428.

Figure 15:
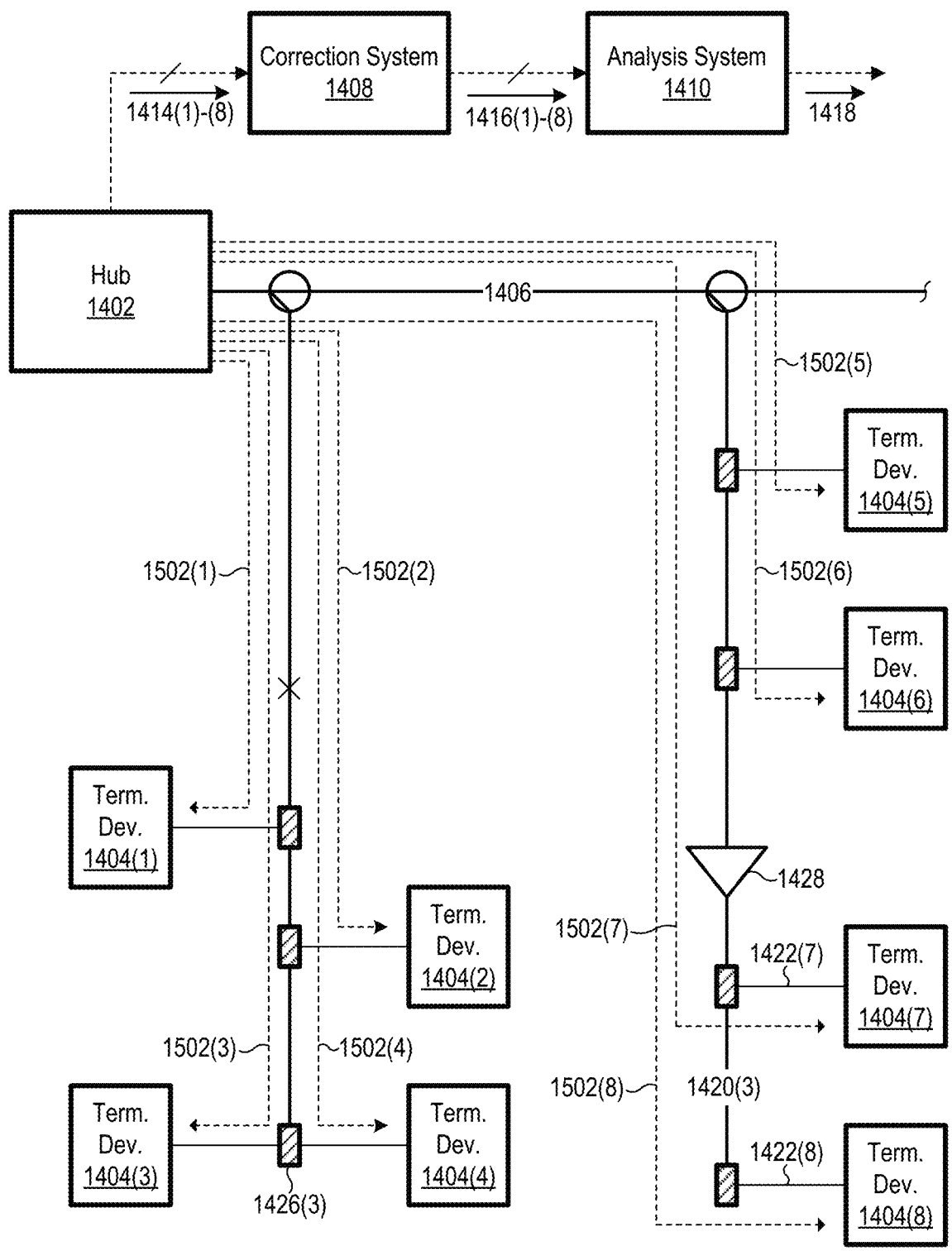
FIG. 15 is another block diagram of the FIG. 14 communication network illustrating communication links formed by the communication network.

Communication network 1400 supports a respective communication link 1502 between hub and each termination device 1404 as symbolically shown in FIG. 15, where FIG. 15 is the same FIG. 14 but modified to (a) illustrate communication links 1502 and (b) omit several reference numbers for illustrative clarity. For example, communication network 1400 supports a communication link 1502(1) between hub 1402 and termination device 1404(1) via main cable 1406, splitter 1424(1), branch cable 1420(1), tap 1426(1), and drop cable 1422(1). As another example, communication network 1400 supports a communication link 1502(2) between hub 1402 and termination device 1404(2) via main cable 1406, splitter 1424(1), branch cable 1420(1), tap 1426(1), tap 1426(2), and drop cable 1422(2). Accordingly, communication links 1502 share communication network infrastructure. For example, communication links 1502(1) and 1502(2) share main cable 1406, splitter 1424(1), branch cable 1420(1), and tap 1426(1).

Communication network 1400 provides a respective set of raw equalizer coefficients 1414 to correction system 1408 for each communication link 1502. In particular, communication network 1400 provides raw equalizer coefficients 1414(1) for communication link 1502(1), communication network 1400 provides raw equalizer coefficients 1414(2) for communication link 1502(2), communication network 1400 provides raw equalizer coefficients 1414(3) for communication link 1502(3), and so on. Each set of raw equalizer coefficients 1414 is analogous to raw equalizer coefficients 114 of FIG. 1. For example, each set of raw equalizer coefficients 1414 may include pre-distortion raw equalizer coefficients and/or post-distortion raw equalizer coefficients. Additionally, in certain embodiments, each set of raw equalizer coefficients 1414 represents a channel response, or an inverse of a channel response, of its respective communication link 1502. For instance, in some embodiments, raw equalizer coefficients 1414(1) represent a channel response, or an inverse of a channel response, of communication link 1502(1), and raw equalizer coefficients 1414(2) represent a channel response, or an inverse of a channel response, of communication link 1502(2).

Correction system 1408 is similar to correction system 108 of FIG. 1, but correction system 1408 is configured to correct multiple sets of raw equalizer coefficients. Specifically, correction system 1408 is configured to at least substantially remove random time delay from each set of raw equalizer coefficients 1414 to generate a corresponding set of corrected equalizer coefficients 1416 which are at least substantially free of random time delay and associated variation in phase. For example, corrected equalizer coefficients 1416(1) are the same as raw equalizer coefficients 1414(1) but with any random time delay removed, and corrected equalizer coefficients 1416(2) are the same as raw equalizer coefficients 1414(2) but with any random time delay removed. Correction system 1408 is configured to generate each set of corrected raw coefficients 1416 from a corresponding set of raw equalizer coefficients 1414, for example, by executing an embodiment of method 500 of FIG. 5.

Analysis system 1410 is configured to determine one or more properties 1418 of communication network 1400 at least partially from one or more sets of corrected raw equalizer coefficients 1416. For example, some embodiments of analysis system 1410 are configured to determine one or more properties of individual communication links 1502, such as in a manner similar to how analysis system 110 of FIG. 1 may determine one or more properties of communication link 106. Additionally, some embodiments of analysis system 1410 are configured to compare two or more communication links 1502 of communication network 1414 by comparing their respective corrected equalizer coefficients 1416, to determine a relationship between the communication links. For example, certain embodiments of analysis system 1410 are configured to compare communication links 1502(1) and 1502(2) by dividing corrected equalizer coefficients 1416(1) of communication link 1502(1) by corrected equalizer coefficients 1416(2) of communication link 1502(2) using complex frequency domain division. The resulting quotients will be 1.0 at zero degrees if communication links 1502(1) and 1502(2) have identical sets of corrected equalizer coefficients 1416, and the resulting quotient will be a value other than one, with a potential non-zero phase, if the two communication links have non-identical sets of corrected equalizer coefficients 1416.

Figure 16:
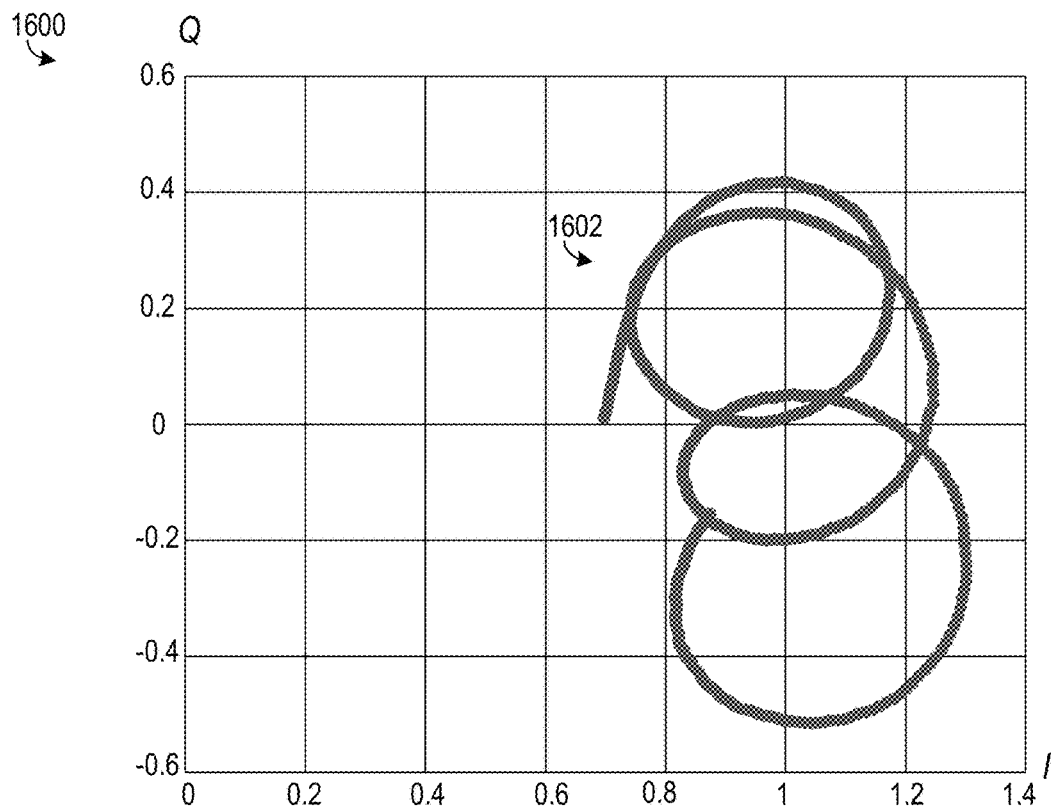
FIG. 16 is a graph of I components versus Q components of example corrected equalizer coefficients of a first communication link of the FIG. 14 communication network.
Figure 17:
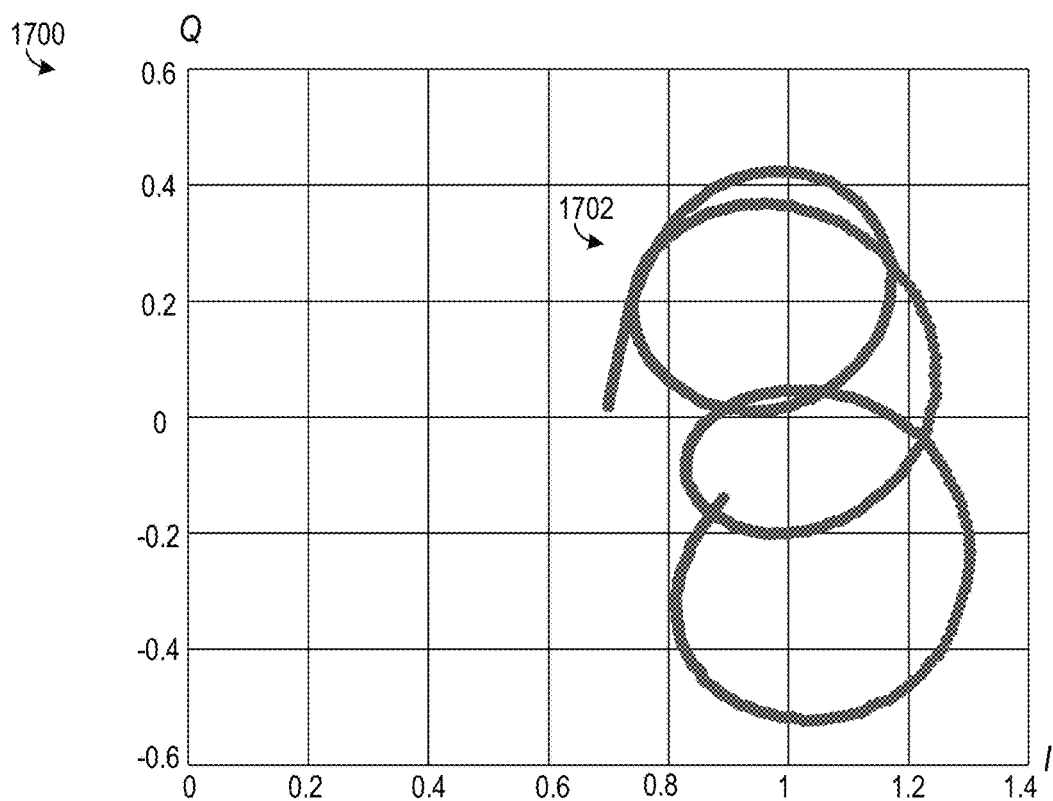
FIG. 17 is a graph of I components versus Q components of example corrected equalizer coefficients of a second communication link of the FIG. 14 communication network.
Figure 18:
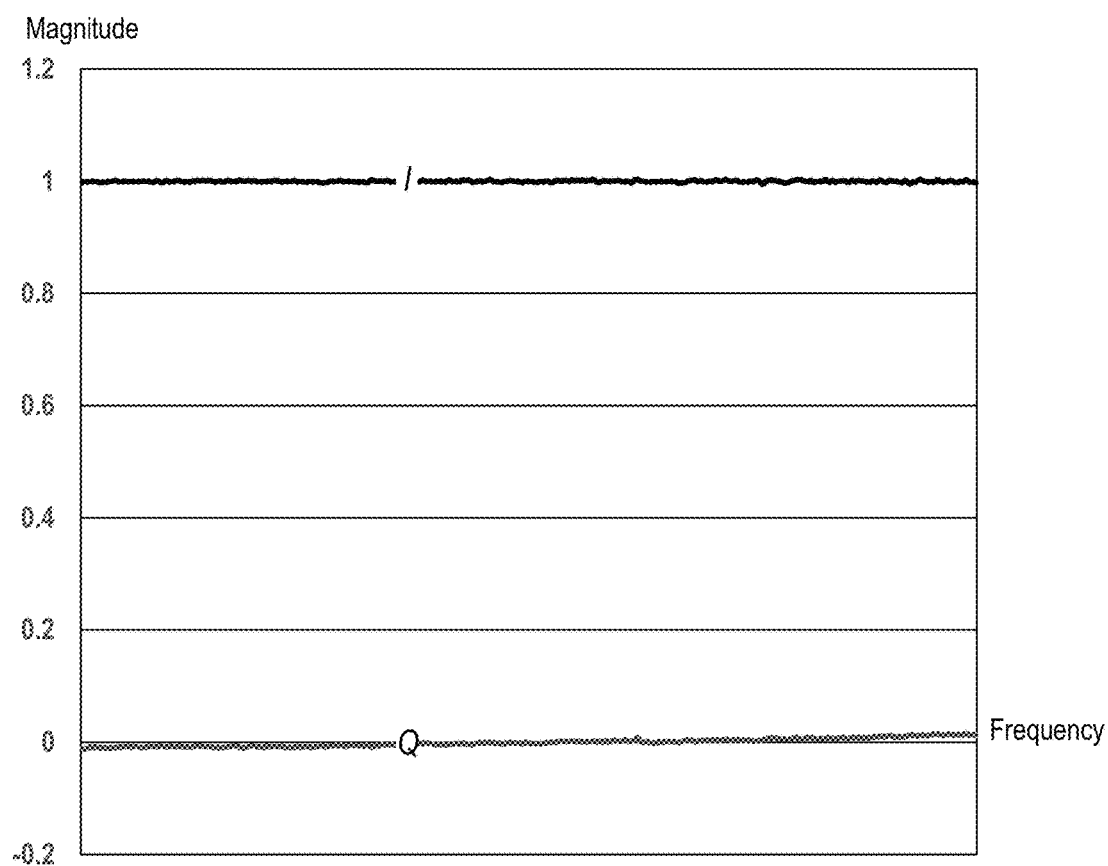
FIG. 18 is a graph of quotients of the FIG. 16 example corrected equalizer coefficients divided by the FIG. 17 example corrected equalizer coefficients.

FIG. 16-18 collectively illustrate one example of how analysis system 1410 could compare corrected equalizer coefficients 1416 of two communication links 1502 of communication network 1400. FIG. 16 is a graph 1600 of I components versus Q components of corrected equalizer coefficients 1602, and FIG. 17 is a graph 1700 of I components versus Q components of corrected equalizer coefficients 1702. Corrected equalizer coefficients 1602 and 1702 are embodiments of corrected equalizer coefficients 1416(1) and 1416(2), respectively. Accordingly, corrected equalizer coefficients 1602 and 1702 respectively correspond to embodiments of communication links 1502(1) and 1502(2).

Analysis system 1410 is configured to divide each corrected equalizer coefficients 1602 by a corresponding corrected equalizer coefficients 1702 using complex frequency domain division to yield a quotient illustrated in a graph 1800 of FIG. 18, which graphs the magnitude of each of the I and Q components of the quotient as a function of frequency. As evident when comparing graphs 16 and 17, corrected equalizer coefficients 1602 and 1702 are substantially identical, which causes their quotient to be substantially to equal to one with a phase of zero, as shown in FIG. 18 by the I component being substantially equal to one and the Q component substantially equal to zero.

Some embodiments of analysis system 1410 are configured to determine a distortion matching metric (DMM) by evaluating EQN. 2 below, where the distortion metric quantifies to what extent two communication links 1502 experience common linear distortion. In EQN. 2, (a) i is an index ranging from 1 to N, where N is number of corrected equalizer coefficients 1416 in each set of corrected equalizer coefficients, (b) $EQ1_i$, is the ith corrected equalizer coefficients 1416 for a first communication link 1502, and (c) $EQ2_i$, is the ith corrected equalizer coefficients 1416 for a second communication link 1502. The division of EQN. 2 is performed using complex frequency domain division.

$$DMM = \frac{\sum_{i=1}^{N}\left|\frac{EQ1i}{EQ2i}\right|}{N} \quad \text{(EQN. 2)}$$

A quotient of corrected equalizer coefficients 1416 is optionally converted from the frequency domain to the time domain (not shown), such as by using an inverse Fourier transform process. In cases where the two sets of corrected equalizer coefficients 1416 are substantially similar, such as in the examples of FIGS. 16 and 17, almost all power of the quotient in the time domain will be in the temporal DC term. Accordingly, particular embodiments of analysis system 1410 are configured to compare power of the temporal DC term of the quotient to collective power of all other temporal terms of the quotient, to quantify similarity in channel responses of the two corresponding communication links 1502. For example, some embodiments of analysis system 1410 are configured to determine that the two communication links 1502 have similar responses in response to relative a ratio of power of the DC temporal term of the quotient to collective power of all other temporal terms of the quotient exceeding a predetermined threshold value. Effects of local communication infrastructure, e.g., effects of wiring in buildings including termination devices 1404, can be masked by eliminating (zeroing) low value time domain coefficients when comparing power of the temporal DC term to the power of the other temporal terms to determine similarity of communication links.

As discussed above, corrected equalizer coefficients of a given communication link are indicative of linear distortion experienced by a signal traversing the communication link. Linear distortion experienced by a signal traversing the communication link, in turn, is a function of the channel response of the communication link. Consequently, comparing respective corrected equalizer coefficients of two communication links 1502 of communication network 1400 indicates to what the extent the two communication links 1502 have similar channel responses. Two communication links 1502 having the same corrected equalizer coefficients 1416 have at least substantially identical channel responses, while two communication links 1502 having significantly different corrected equalizer coefficients 1416 have significantly different channel responses. For example, in the example of FIGS. 16-18 discussed above, the quotient of FIG. 18 indicates that communication links 1502(1) and 1502(2) have substantially identical corrected equalizer coefficients 1416, which indicates that these two communication links also have substantially identical channel responses.

Accordingly, some embodiments of analysis system 1410 are configured to compare corrected equalizer coefficients 1416 of two or more communication links 1502, such as by dividing corrected equalizer coefficients of one communication link 1502 by corresponding corrected equalizer coefficients of another communication link 1502 using complex frequency domain division, to determine to what extent the communication links 1502 are suffering from a common impairment. Similarity in corrected equalizer coefficients 1416 of two communication links may indicate that the two communication links are suffering from a common impairment, or from related impairments. For example, branch cable 1420(1) of communication network 1400 has an impairment in the form of an impedance mismatch 1430 upstream of termination devices 1404(1)-1404(4). Consequently, it is anticipated that each of corrected equalizer coefficients 1416(1)-1416(4) of corresponding communication links 1502(1)-1502(4) would be at least somewhat similar because each set of equalizer coefficients 1416(1)-1416(4) is at least partially compensating impedance mismatch 1430. Indeed, the example corrected equalizer coefficients of FIGS. 16 and 17 corresponding to communication links 1502(1) and 1502(2), respectively, are substantially identical, which indicates that both communication links are suffering from impedance mismatch 1430. Determination that multiple communication links 1502 are suffering from a common impairment may facilitate impairment diagnosis and repair by limiting the impairment to a communication medium and/or infrastructure shared by the two communication links. For example, determination that each of communication links 1502(1) and 1502(2) are suffering from a common impedance mismatch indicates that the impedance mismatch must be in a portion of communication network 1404 shared by the two communication links, which helps determine location of the impedance mismatch.

Additionally certain embodiments of analysis system 1410 are configured to determine whether two or more termination devices 1404 are served by common infrastructure, such as a common cable, splitter, and/or amplifier, by comparing corrected equalizer coefficients 1416 of the communication links 1502 corresponding to the termination devices. Two termination devices 1502 are likely served by common infrastructure if they have similar associated corrected equalizer coefficients. For example, it is anticipated that corrected equalizer coefficients 1416 corresponding to termination devices 1404(5) and 1404(6) would be substantially similar, barring a problem unique to one of the termination devices, because both of the termination devices are served by substantially the same infrastructure (i.e., main cable 1406, splitter 1424(2), and branch cable 1420(2)). Similarly, it is anticipated that corrected equalizer coefficients 1416 corresponding to termination devices 1404(7) and 1404(8) would be substantially similar, barring a problem unique to one of the termination devices, because both of the termination devices are served by substantially the same infrastructure (i.e., main cable 1406, splitter 1424(2), branch cable 1420(2), amplifier 1428, and branch cable 1420(3)). However, it is anticipated that the corrected equalizer coefficients 1416 corresponding to termination devices 1404(7) and 1404(8) would be significantly different from corrected equalizer coefficients 1416 corresponding to termination devices 1404(5) and 1404(6) because termination devices 1404(7) and 1404(8) are downstream of amplifier 1428 while termination devices 1404(5) and 1404(6) are upstream of amplifier 1428.

Example Instructions

By way of example and not by limitation, the following is one example of C++ code that is executed by certain embodiments of the correction systems disclosed herein to generate corrected equalizer coefficients from raw equalizer coefficients:

```
#include <iostream>
#include <math.h>
#include <stdio.h>
#include <stdlib.h>
#include <malloc.h>
#include <time.h>
#include <string.h>
#include <unistd.h>
#ifdef _WIN32
#include<conio.h>
#endif
typedef struct {float real, imag;} COMPLEX;
extern void correct(COMPLEX *,int,int,int,int,int);
extern void idft(COMPLEX *, COMPLEX *, int);
extern void dft(COMPLEX *, COMPLEX *, int);
void FDinvert(COMPLEX *,int);
float PI=3.141592653, MTR;
int fftSize=404, cnt, good;
//int fftSize=1880, cnt, good;
int main()
{
printf("running batchOFDM\n");
COMPLEX *w;
w=(COMPLEX*) calloc(4096, sizeof(COMPLEX));
if(!w) {printf("\n Unable to allocate input memory.\n"); printf("\x7"); exit(1); }
    FILE *input, *output,*outputR;
    int i,offset=0,lineLength=404;
    char *pch;
    char delim[]=" ";//delimiter is a tab or a space
    char data[80000]={0};
    float A[4096],B[4096];
    //if((input=fopen("daniel404.txt", "r"))==NULL)
    if((input=fopen("800.txt", "r"))==NULL)
    {//read data
    printf("could not open file.\n");
    system("pause");
    free(w);
    exit(0);
    if((output=fopen("output.txt", "w"))==NULL)
    {
    //write results to a file
    printf("could not open file.\n");
    system("pause");
    free(w);
    fclose(input);
    exit(0);
    }
    if((outputR=fopen("outputR.txt", "w"))==NULL)
    {//write results to a file
    printf("could not open file.\n");
    system("pause");
    free(w);
    fclose(output);
```

```
    fclose(input);
    exit(0);
    {
    for(cnt=0;cnt<1;cnt++)
    {
    //for batch processing enter number of data sets in input file
    //printf("\n\nLine Nr.=% d\n",cnt);
\*
    for(i=0;i<lineLength;i++){//all lines set to this length
    sf=fscanf(input,"% f % f",&a,&b);
    if(i>=offset && i<fftSize*2+offset){
    w[i-offset].real=a;//a
    w[i-offset].imag=b;//b
    }
    {
*/
    // DRL: if less than cnt lines, data will be empty (except for newline),
    // strtok will return NULL, and atof will crash
    fgets(data,80000,input);
    pch=strtok(data,delim);
    if (pch==NULL)
    {
    //printf("No data\n");
    continue;
    }
    A[0]=atof(pch);
    pch=strtok(NULL,delim);
    if (pch==NULL)
    {
    //printf("No data\n");
    continue;
    }
    B[0]=atof(pch);
    i=1;
    while(pch!=NULL)
    {
    pch=strtok(NULL,delim);
    if (pch==NULL)
    break;
    A[i]=atof(pch);
    pch =strtok(NULL,delim);
    if (pch==NULL)
    break;
    B[i]=atof(pch);
    i++;
    }
    lineLength=i;//how many numbers were read in
    for(i=0;i<fftSize;i++)
    {//all lines set to this length
    if(i>=offset && i<fftSize*2+offset)
    {
    w[i-offset].real=A[i];
    w[i-offset].imag=B[i];
    }
    {
    //data looks like I value followed by Q value followed by next I value followed by next Q value
    //eg:  −1.343994141  −0.490112305  1.233276367
−0.723999023  −0.2265625  1.406616211  −0.934570313
−1.072509766 1.419677734 −0.033813477
    //offset is used to pick a start point not at the start of the file. This can reduce effects of GD. But you must make sure
    //you have enough I-Q samples on the line or an error will occur
```

```
fprintf(output,"file=% d\tLine Length=% d\tRead Off-
est=% d\n",cnt,lineLength,
    offset);//SC=subcarriers
  printf("\nfile=% d\tLine Length=% d SC\tRead Offest=%
d SC\n",cnt,lineLength, offset);
  for(i=0;i<fftSize;i++)
  {//input data
  fprintf(output,"F % d\t % f\t % f\n",i,w[i].real,w[i].imag);
  fprintf(output,"\n");
  correct(w,fftSize,0,fftSize,cnt,0);//this function is used to
process both pre and post equalziation data
  //do a second time to remove residual rotation
  correct(w,fftSize,0,fftSize,cnt,1);
  //void correct(COMPLEX *w,int np, int s1, int s2,int
fn,int iteration)
  //FDinvert(w,fftSize); //optional step to look at what a
VNA wouud see, not the inverse
  for(i=0;i<fftSize;i++)
  {
  fprintf(outputR,"% f,",w[i].real);
  if(w[i].imag>=0)
  {
  fprintf(outputR,"+% f,",w[i].imag);
  }
  else
  {
  fprintf(outputR,"% f,",w[i].imag);
  }
  }
  fprintf(outputR,"\n");
  }
  fclose(outputR);
  fclose(output);
  fclose(input);
  return(0);
  }//end                of              MAI
N///////////////////////////////////////////////////////////////
//////////////////
  void FDinvert(COMPLEX *w,int np)
  {//take FD reciprocal
  int i;
  float a,b,DENOM;
  for(i=0;i<np;i++)
  {
  a=w[i].real;
  b=w[i].imag;
  DENOM=a*a+b*b;
  w[i].real=a/DENOM;
  w[i].imag=-b/DENOM;
  }
  }
  void correct(COMPLEX *w,int np, int s1, int s2,int fn,int
iteration)
  {
  FILE *output;
  int i,sp=1;//0 sp supresses fprintf, 1 prints inline
  float   th1=0,mag=0,angle[4096],dphi=0,theta,delta=0,
pow=0,DCpow=0,oldang,gd;
  double ang;
  char readme[16];
  sprintf(readme,"output % d.txt",0);//to supress making a
file for every response
  COMPLEX *s;
  s=(COMPLEX*) calloc(4096, sizeof(COMPLEX));
  if(!s)
  {
  printf("\n Unable to allocate input memoryAn");
  printf("\x7");
  // add cleanup here
  exit(1);
  }
  COMPLEX *r;
  r=(COMPLEX*) calloc(4096, sizeof(COMPLEX));
  if(!r)
  {
  printf("\n Unable to allocate input memoryAn");
  printf("\x7");
  // add cleanup here
  exit(1);
  }
  COMPLEX *t;
  t=(COMPLEX*) calloc(4096, sizeof(COMPLEX));
  if(!t)
  {
  printf("\n Unable to allocate input memory.\n");
  printf("\x7");
  // add cleanup here
  exit(1);
  }
  COMPLEX *u;
  u=(COMPLEX*) calloc(4096, sizeof(COMPLEX));
  if(!u)
  {
  printf("\n Unable to allocate input memory.\n");
  printf("\x7");
  // add cleanup here
  exit(1);
  }
  COMPLEX *ws;
  ws=(COMPLEX*) calloc(4096, sizeof(COMPLEX));
  if(!ws)
  {
  printf("\n Unable to allocate input memory.\n");
  printf("\x7");
  // add cleanup here
  exit(1);
  COMPLEX *x;
  x=(COMPLEX*) calloc(4096, sizeof(COMPLEX));
  if(!x)
  {
  printf("\n Unable to allocate input memory.\n");
  printf("\x7");
  // add cleanup here
  exit(1);
  }
  COMPLEX *y;
  y=(COMPLEX*) calloc(4096, sizeof(COMPLEX));
  if(!y)
  {
  printf("\n Unable to allocate input memory.\n");
  printf("\x7");
  // add cleanup here
  exit(1);
  }
  if((output=fopen(readme, "w"))==NULL)
  {
  printf("could not open file.\n");
  system("pause");
  // add cleanup here
  exit(0);
  printf("\n");
  //middle frequency is np/2
  th1=atan2(w[np/2].imag,w[np/2].real);
```

```
for(i=0;i<fftSize;i++)
{
ws[i].real=w[i].real; //copy and store the input
ws[i].imag=w[i].imag;
}
printf("delay correction pass #% d\tFFT Size=%
d\tAnalysis between FFT sample % d and sample % d\n",
iteration, fftSize,s1,s2);
//printf("freq=%   d\txR=%   f\txI=%   f\tang=%   f\n",
np ,w[np/2].real,w[np/2].imag,th1,th2);
if (sp==1)
fprintf(output,"P1_1 input FD data: I, Q, angle[]\
tLine #=% d\n", fn);
// /* begin rotation removal function
for(i=0;i<np;i++)
{
angle[i]=atan2(ws[i].imag,ws[i].real);
ang=atan2(ws[i].imag,ws[i].real);
if(sp==1)fprintf(output, "―% d\t % f\t % f\t % f\n",i,ws
[i].real,ws[i].imag,angle[i]); //raw data Dan bug
fix 2
}
float phi=0;
for(i=fftSize/2+1;i<fftSize;i++)
{//LSB
dphi=angle[i]-angle[i-1]; //note abs only works for inte-
gers
phi+=dphi;
if(dphi>PI) {phi-=2*PI;)// printf("going clockwise");}
if(dphi<-PI) {phi+=2*PI;)// printf("going counter clock-
wise");}
}
//for(i=1;i<900;i++)
for(i=1;i<fftSize/2;i++)
{//USB Dan bug fix 1
dphi=angle[i]-angle[i-1]; //note abs only works for inte-
gers
phi+=dphi;
if(dphi>PI) {phi-=2*PI;)// printf("going clockwise");}
if(dphi<-PI) {phi+=2*PI;)//printf("going counter clock-
wise");}
}
delta=-phi/(float)(s2-s1);//delay estimate
printf("Radians rotation=% f\tSlope=% f radians per
subcarrier\n",phi,delta);//reduce the delta by
number of -pi to pi jumps
//end rotation removal function
if(sp==1)
fprintf(output,"2 rotation removed in FD\n");
for(i=0;i<np;i++)
{
ang=-(float)i*delta;//(float)np;
u[i].real=ws[i].real*cos(-ang)-ws[i].imag sin(-ang);//w
is impaired
u[i].imag=ws[i].real*sin(-ang)+ws[i].imag*cos(-ang);
ang=atan2(u[i].imag,u[i].real);
if(sp==1)
fprintf(output, "2C % d\t % f\t % f\t % f\n",i,u[i].real,u
[i].imag,ang);
}
//now split fd data into sidebands for using ifft
for(i=0;i<np/2;i++)
{//upper sideband
s[i].real=u[i+np/2].real;
s[i].imag=u[i+np/2].imag;
}
for(i=0;i<np/2;i++)
{//lower sideband
s[fftSize-np/2+i].real=u[i].real;
s[fftSize-np/2+i].imag=u[i].imag;
if(sp==1)fprintf(output,"3 sidebands swapped\n");
for(i=0;i<fftSize;i++)
{
t[i].real=s[i].real;
t[i].imag=s[i].imag;
}
for(i=0;i<fftSize;i++)
{
mag=sqrt(t[i].real*t[i].real+t[i].imag*t[i].imag) ;
if(sp==1) fprintf(output,"3Sf % d\t % f\t % f\t % f\n",i,t
[i].real,t[i].imag,mag);
}
idft(s,r,fftSize);//tom
for(i=0;i<fftSize;i++)
{
s[i].real=r[i].real;
s[i].imag=r[i].imag;
}
if(sp==1)
fprintf(output,"4 TD with angle err.\n");
for(i=0;i<fftSize;i++)
{
mag=sqrt(s[i].real*s[i].real+s[i].imag*s[i].imag);
if(sp==1)
fprintf(output,"4St % d\t % f\t % f\t % f\n",i,s[i].
real,s[i].imag,mag);
}
for(i=0;i<32;i++)
{
mag=sqrt(s[i].real*s[i].real+s[i].imag*s[i].imag);
if(sp==1)
fprintf(output,"4St % d\t % f\t % f\t % f\n",i,s[i].
real,s[i].imag,mag);
}
theta=atan2(s[0].imag,s[0].real);//rotate the DC term
printf("DC term rotation=% f radians\n",theta);
ang=theta;
if(sp==1)fprintf(output,"5 TD angle=0 deg\n");
for(i=0;i<fftSize;i++)
{
x[i].real=s[i].real*cos(-ang)-s[i].imag*sin(-ang);//w is
unimpaired
x[i].imag=s[i].real*sin(-ang)+s[i].imag*cos(-ang);
mag=sqrt(x[i].real*x[i].real+x[i].imag*x[i].imag);
if(sp==1)
fprintf(output, "5@CT % d\t % f\t % f\t % f\n",i,x
[i].real,x[i].imag,mag,20*log10(mag));
}
for(i=0;i<64;i++)
{// 1024-32=992
mag=sqrt(x[i].real*x[i].real+x[i].imag*x[i].imag);
if(sp==1)
fprintf(output, "5@CT % d\t % f\t % f\t % f\n",i,x
[i].real,x[i].imag,mag,20*log10(mag));
}
for(i=0;i<fftSize;i++)
{
y[i].real=x[i].real;
y[i].imag=x[i].imag;
}
dft(y,r,fftSize);
for(i=0;i<fftSize;i++)
{
y[i].real=r[i].real;
```

```
y[i].imag=r[i].imag;
}
//y has the correct answer
for(i=0;i<fftSize/2;i++)
{//swap sidebands back
w[i].real=y[i+fftSize/2].real;
w[i].imag=y[i+fftSize/2].imag;
}
for(i=0;i<fftSize/2;i++)
{
w[i+fftSize/2].real=y[i].real;
w[i+fftSize/2].imag=y[i].imag;
}
if(sp==1)fprintf(output,"6 FD corrected\n");
for(i=fftSize/2;i<fftSize;i++)
{
mag=sqrt(y[i].real*y[i].real+y[i].imag*y[i].imag);
ang=atan2(y[i].imag,y[i].real);
gd=-(ang-oldang)/50000; //assuming a 50 kHz subcarrier spacing
    if(sp==1)
    fprintf(output,
    "6CF % d\t % f\t % f\t % f\t % f\t % f\t % e\n",
i,y[i].real,y[i].imag,mag,20*log10(mag),ang,gd);
    oldang=ang;
  }
  for(i=0;i<fftSize/2;i++)
  {
// mag=sqrt(y[i].real*y[i].real+y[i].imag*y[i].imag);
// if(sp==1)
// fprintf(output, "6CF % d\t % f\t % f\t % f\t % f\n",i,y[i]seal,y[i].imag,mag,20*log10(mag));
mag=sqrt(y[i].real*y[i].real+y[i].imag*y[i].imag);
ang=atan2(y[i].imag,y[i].real);
gd=-(ang-oldang)/50000; //assuming a 50 kHz subcarrier spacing
    if(sp==1)
    fprintf(output,
    "6CF % d\t % f\t % f\t % f\t % f\t % f\t % e\n",
i,y[i].real,y[i].imag,mag,20*log10(mag),ang,gd);
    oldang=ang;
  }
  pow=0; //initialize
  for(i=0;i<fftSize;i++)
  {
  pow+=x[i].real*x[i].real+x[i].imag*x[i].imag;
  }
  DCpow=x[0].real*x[0].real+x[0].imag*x[0].imag;//imag component should be zero
    printf("total power=% f\tDCpower=% f\n",pow,DCpow);
    printf("power correction to unity power is % f\t % f dB\n",1/pow, 10*log10(1/pow));
    float Vcorr=sqrt(1/pow);
    printf("voltage correction is % f\n", Vcorr);
    for(i=0;i<fftSize;i++)
    {
    x[i].real *=Vcorr;
    x[i].imag *=Vcorr;
    DCpow=x[0].real*x[0].real+x[0].imag*x[0].imag;//imag component should be zero
    MTR=10*log10(1-DCpow)/1.0;
    printf("DC power=% f\t Other power=% f\t MTR=% f\n",DCpow,1.0-DCpow, MTR) ;
fclose(output);
}//END  Correct  ////////////////////////////////////////////
//// /*************************************
 **************************************
 dft-Discrete Fourier Transform
 This function performs a straight DFT of N points on an array of
 complex numbers whose first member is pointed to by Datain. The
 output is placed in an array pointed to by Dataout.
 *************************************
 *************************************/
 void dft(COMPLEX *Datain, COMPLEX *Dataout, int N)
{
int i,k,n,p;
static int nstore=0; /* store N for future use */
static COMPLEX *cf; /* coefficient storage */
COMPLEX *cfptr,*Dinptr;
double arg;
/* Create the coefficients if N has changed */
if (N !=nstore) {
if(nstore !=0) free((char *) cf); /* free previous */
cf=(COMPLEX *) calloc(N, sizeof(COMPLEX));
if (!cf) {
printf("\nUnable to allocate memory for coefficients.\n");
// add cleanup here
exit(1);
}
arg=8.0*atan(1.0)/N;
for (i=0; i<N ; i++) {
cf[i].real=(float)cos(arg*i);
cf[i].imag=-(float)sin(arg*i);
}
}
/* Perform the DFT calculation */
printf("\n");
for (k=0; k<N ; k++) {
Dinptr=Datain;
Dataout->real=Dinptr->real;
Dataout->imag=Dinptr->imag;
Dinptr++;
for (n=1; n<N; n++) {
p=(int)((long)n*k % N);
cfptr=cf+p; /* pointer to cf modulo N */
Dataout->real+=Dinptr->real * cfptr->real
 -Dinptr->imag * cfptr->imag;
Dataout->imag+=Dinptr->real * cfptr->imag
 +Dinptr->imag * cfptr->real;
Dinptr++;
}
if (k % 32 ==31) printf("*");
Dataout++; /* next output */
}
printf("\n");
}
/************************************
 *************************************
 idft-Inverse Discrete Fourier Transform
 This function performs an inverse DFT of N points on an array of complex numbers whose first member is pointed to by Datain. The output is placed in an array pointed to by Dataout.
```

It returns nothing.
```
*****************************************
*****************************************/
void idft(COMPLEX *Datain, COMPLEX *Dataout, int N)
{
int i,k,n,p;
static int nstore=0; /* store N for future use */
static COMPLEX *cf; /* coefficient storage */
COMPLEX *cfptr,*Dinptr;
double arg;
/* Create the coefficients if N has changed */
if(N!=nstore) {
if(nstore !=0) free((char*) cf); /* free previous */
cf=(COMPLEX *) calloc(N, sizeof(COMPLEX));
if (cf ==0) {
printf("\nUnable to allocate memory for coefficients.\n");
// add cleanup here
exit(1);
}
/* scale stored values by 1/N */
arg=8.0*atan(1.0)/N;
for (i=0; i<N ; i++) {
cf[i].real=(float)(cos(arg*i)/(double)N);
cf[i].imag=(float)(sin(arg*i)/(double)N);
}
}
/* Perform the DFT calculation */
printf("\n");
for (k=0; k<N ; k++) {
Dinptr=Datain;
Dataout->real=Dinptr->real*cf[0].real;
Dataout->imag=Dinptr->imag*cf[0].real;
Dinptr++;
for (n=1; n<N; n++) {
p=(int)((long)n*k % N);
cfptr=cf+p; /* pointer to cf modulo N */
Dataout->real+=Dinptr->real * cfptr->real
 −Dinptr->imag*cfptr->imag;
Dataout->imag+=Dinptr->real*cfptr->imag
 +Dinptr->imag*cfptr->real;
Dinptr++;
}
if (k % 32 ==31) printf("*");
Dataout++; /* next output */
printf("\n");
}
```
Combinations of Features Features described above may be combined in various ways without departing from the scope hereof. The following examples illustrate some possible combinations.

(A1) A method for equalizer correction in a communication network includes (1) obtaining raw equalizer coefficients in a frequency domain, (2) removing time delay from the raw equalizer coefficients to generate corrected equalizer coefficients in a time domain such that a direct current (DC) corrected equalizer coefficient of the corrected equalizer coefficients has a phase of zero, and (3) converting the corrected equalizer coefficients from the time domain to the frequency domain.

(A2) In the method denoted as (A1), removing time delay from the raw equalizer coefficients to the generate corrected equalizer coefficients may include (1) removing linear delay from the raw equalizer coefficients in the frequency domain to generate first equalizer coefficients, (2) converting the first equalizer coefficients from the frequency domain to the time domain to generate second equalizer coefficients, and (c) rotating phase of all second equalizer coefficients by a phase of a DC second equalizer coefficient, to generate the corrected equalizer coefficients.

(A3) The method denoted as (A2) may further include estimating the linear delay from a change in phase of the raw equalizer coefficients with respect to frequency.

(A4) The method denoted as (A3) may further include excluding one or more portions of the raw equalizer coefficients that are affected by group delay, when estimating the linear delay from the change in phase of the raw equalizer coefficients with respect to frequency.

(A5) Any one of the methods denoted as (A2) through (A4) may further include determining the phase of the DC second equalizer coefficient.

(A6) Any one of the methods denoted as (A1) through (A5) may further include normalizing the corrected equalizer coefficients.

(A7) In any one of the methods denoted as (A1) through (A6), the raw equalizer coefficients may represent one of a channel response of a communication link and an inverse of a channel response of a communication link.

(A8) In any one of the methods denoted as (A1) through (A7), the raw equalizer coefficients may be one of pre-distortion equalizer coefficients or post-distortion equalizer coefficients.

(A9) Any one of the methods denoted as (A1) through (A8) may further include determining a linear distortion of a communication link at least partially based on a relationship between (1) magnitude of the DC corrected equalizer coefficient and (2) total magnitude of all corrected equalizer coefficients.

(A10) Any one of the methods denoted as (A1) through (A9) may further include determining group delay of a communication link from the corrected equalizer coefficients.

(A11) Any one of the methods denoted as (A1) through (A10) may further include determining a location of an impairment in a communication link from the corrected equalizer coefficients.

(B1) A method for comparing communication links in a communication network includes (1) obtaining first raw equalizer coefficients in a frequency domain, the first raw equalizer coefficients corresponding to a first communication link, (2) obtaining second raw equalizer coefficients in the frequency domain, the second raw equalizer coefficients corresponding to a second communication link, (3) removing time delay from the first raw equalizer coefficients to generate first corrected equalizer coefficients, (4) removing time delay from the second raw equalizer coefficients to generate second corrected equalizer coefficients, and (5) comparing the first corrected equalizer coefficients to the second corrected equalizer coefficients to determine a relationship between the first and second communication links.

(B2) In the method denoted as (B1), the relationship between the first and second communication links may be that the first and second communication links are suffering from a common impairment.

(B3) In the method denoted as (B1), the relationship between the first and second communication links may be that the first and second communication links are served by common infrastructure.

(B4) In any one of the methods denoted as (B1) through (B3), comparing the first corrected equalizer coefficients to the second corrected equalizer coefficients may include dividing each first corrected equalizer coefficient by a corresponding second corrected equalizer coefficient.

(B5) In any one of the methods denoted as (B1) through (B4), comparing the first corrected equalizer coefficients to the second corrected equalizer coefficients may include determining a distortion matching metric of the first and second communication links.

(B6) In any one of the methods denoted as (B1) through (B5), (1) removing time delay from the first raw equalizer coefficients to generate first corrected equalizer coefficients may include generating the first corrected equalizer coefficients such that a direct current (DC) first corrected equalizer coefficient of the first corrected equalizer coefficients has a phase of zero, and (2) removing time delay from the second raw equalizer coefficients to generate second corrected equalizer coefficients may include generating the second corrected equalizer coefficients such that a DC second corrected equalizer coefficient of the second corrected equalizer coefficients has a phase of zero.

(B7) In any one of the methods denoted as (B1) through (B6), (1) the first raw equalizer coefficients may represent one of a channel response of the first communication link and an inverse of a channel response of the first communication link, and (2) the second raw equalizer coefficients may represent one of a channel response of the second communication link and an inverse of a channel response of second first communication link.

(B8) In any one of the methods denoted as (B1) through (B7), the first raw equalizer coefficients may be one of pre-distortion equalizer coefficients or post-distortion equalizer coefficients, and (2) the second raw equalizer coefficients may be one of pre-distortion equalizer coefficients or post-distortion equalizer coefficients.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for comparing communication links in a communication network, comprising:
    obtaining first raw equalizer coefficients in a frequency domain, the first raw equalizer coefficients corresponding to a first communication link;
    obtaining second raw equalizer coefficients in the frequency domain, the second raw equalizer coefficients corresponding to a second communication link;
    removing time delay from the first raw equalizer coefficients to generate first corrected equalizer coefficients;
    removing time delay from the second raw equalizer coefficients to generate second corrected equalizer coefficients; and
    comparing the first corrected equalizer coefficients to the second corrected equalizer coefficients to determine a relationship between the first and second communication links.

2. The method of claim 1, wherein the relationship between the first and second communication links is that the first and second communication links are suffering from a common impairment.

3. The method of claim 1, wherein the relationship between the first and second communication links is that the first and second communication links are served by common infrastructure.

4. The method of claim 1, wherein comparing the first corrected equalizer coefficients to the second corrected equalizer coefficients comprises dividing each first corrected equalizer coefficient by a corresponding second corrected equalizer coefficient.

5. The method of claim 4, wherein dividing comprises using complex frequency domain division.

6. The method of claim 1, wherein comparing the first corrected equalizer coefficients to the second corrected equalizer coefficients comprises determining a distortion matching metric of the first and second communication links.

7. The method of claim 1, wherein:
    removing time delay from the first raw equalizer coefficients to generate first corrected equalizer coefficients comprises generating the first corrected equalizer coefficients such that a direct current (DC) first corrected equalizer coefficient of the first corrected equalizer coefficients has a phase of zero; and
    removing time delay from the second raw equalizer coefficients to generate second corrected equalizer coefficients comprises generating the second corrected equalizer coefficients such that a DC second corrected equalizer coefficient of the second corrected equalizer coefficients has a phase of zero.

8. The method of claim 1, wherein:
    the first raw equalizer coefficients represent one of a channel response of the first communication link and an inverse of a channel response of the first communication link; and
    the second raw equalizer coefficients represent one of a channel response of the second communication link and an inverse of a channel response of second communication link.

9. The method of claim 1, wherein:
    the first raw equalizer coefficients are one of pre-distortion equalizer coefficients or post-distortion equalizer coefficients; and
    the second raw equalizer coefficients are one of pre-distortion equalizer coefficients or post-distortion equalizer coefficients.

10. The method of claim 1, wherein removing time delay from the first raw equalizer coefficients to generate the first corrected equalizer coefficients comprises:
    removing linear delay from the first raw equalizer coefficients in the frequency domain to generate first modified equalizer coefficients;
    converting the first modified equalizer coefficients from the frequency domain to the time domain to generate second modified equalizer coefficients; and
    rotating phase of all second modified equalizer coefficients by a phase of a direct current (DC) second modified equalizer coefficient, to generate the first corrected equalizer coefficients.

11. The method of claim 10, further comprising estimating the linear delay from a change in phase of the first raw equalizer coefficients with respect to frequency.

12. The method of claim 11, further comprising excluding one or more portions of the first raw equalizer coefficients that are affected by group delay, when estimating the linear delay from the change in phase of the first raw equalizer coefficients with respect to frequency.

13. The method of claim 10, further comprising determining the phase of the DC second modified equalizer coefficient.

14. The method of claim 1, further comprising determining a linear distortion of the first communication link at least partially based on (a) magnitude of a direct current (DC) equalizer coefficient of the first corrected equalizer coefficients and (b) total magnitude of all first corrected equalizer coefficients.

15. The method of claim 1, further comprising:
normalizing the first corrected equalizer coefficients; and
normalizing the second corrected equalizer coefficients.

16. A method for comparing communication links in a communication network, comprising:
obtaining first raw equalizer coefficients, the first raw equalizer coefficients corresponding to a first communication link;
obtaining second raw equalizer coefficients, the second raw equalizer coefficients corresponding to a second communication link;
removing time delay from the first raw equalizer coefficients to generate first corrected equalizer coefficients;
removing time delay from the second raw equalizer coefficients to generate second corrected equalizer coefficients; and
comparing the first corrected equalizer coefficients to the second corrected equalizer coefficients to determine a relationship between the first and second communication links.

17. The method of claim 16, wherein comparing the first corrected equalizer coefficients to the second corrected equalizer coefficients comprising dividing the first corrected equalizer coefficients by the second corrected equalizer coefficients.

18. The method of claim 17, wherein dividing the first corrected equalizer coefficients by the second corrected equalizer coefficients comprises using complex frequency domain division to divide the first corrected equalizer coefficients by the second corrected equalizer coefficients.

19. The method of claim 16, wherein the relationship between the first and second communication links is that the first and second communication links are suffering from a common impairment.

20. The method of claim 16, wherein the relationship between the first and second communication links is that the first and second communication links are served by common infrastructure.

* * * * *